United States Patent [19]

Ohta et al.

[11] 4,426,226

[45] Jan. 17, 1984

[54] RECORDING LIQUID

[75] Inventors: Tokuya Ohta, Yokohama; Tsuyoshi Eida, Ichikawa, both of Japan

[73] Assignee: Canon Kabushiki Kaisha, Tokyo, Japan

[21] Appl. No.: 390,995

[22] Filed: Jun. 22, 1982

[30] Foreign Application Priority Data

Jul. 1, 1981 [JP] Japan ............................... 56-103784

[51] Int. Cl.$^3$ ............................................ C09D 11/02
[52] U.S. Cl. ..................................................... 106/22
[58] Field of Search ......................................... 106/22

[56] References Cited

U.S. PATENT DOCUMENTS 4,170,482  10/1979  Mansukhani ........................ 106/20
4,269,627   5/1981  Hwang .................................. 106/22

Primary Examiner—John Kight, III
Assistant Examiner—Amelia B. Yarbrough
Attorney, Agent, or Firm—Fitzpatrick, Cella, Harper & Scinto

[57] ABSTRACT

A recording liquid comprising a recording agent for giving recorded images and a liquid medium for dissolving or dispersing the recording agent, is characterized in that the recording agent comprises at least one of the compounds represented by the following formula (A) and at least one of the compounds represented by the following formula (B):

Formula (A)

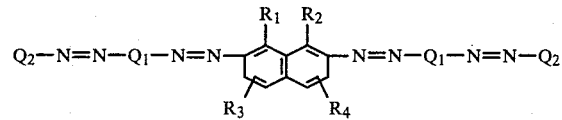

Wherein $Q_1$ and $Q_2$ each represent benzene ring residue or naphthalene ring residue, unsubstituted or substituted by amine, hydroxyl, or sulfo; $R_1$ and $R_2$ each represent hydrogen, hydroxyl, or amino; and $R_3$ and $R_4$ each represent hydrogen or sulfo in the form of salt with an alkali selected from sodium, lithium, potassium, ammonium, and amines, wherein the number of sulfo groups in the molecule is 2 to 8;

Formula (B)

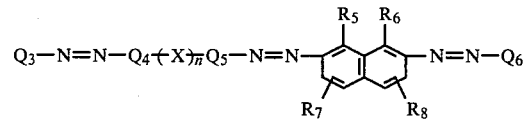

Wherein $Q_3$ and $Q_6$ each represent phenyl or naphthyl, substituted or unsubstituted; $Q_4$ and $Q_5$ each represent 1,4-phenylene or 1,4-naphthylene, substituted or unsubstituted; $R_5$ and $R_6$ each represent hydrogen, hydroxyl, or amino; $R_7$ and $R_8$ each represent hydrogen or sulfo in the form of salt with an alkali selected from sodium, lithium, potassium, ammonium, and amines; X represents —NH—, —N=N—, or —CH=CH—; and n is 0 or 1.

4 Claims, No Drawings

RECORDING LIQUID

BACKGROUND OF THE INVENTION

1. Field of the Invention

This invention relates to a recording liquid for writing means of giving recorded images and more particularly to a recording liquid composition suitable for carrying out recording by flying a recording liquid as liquid droplets from the discharging orifice of a recording head.

2. Description of the Prior Art

Writing tools, as fountain pen, felt pen, etc., for recording on paper or other recording members have so far used as inks solutions of various dyes in water, or an organic solvent.

Such solutions are also used for the so-called ink-jet recording process in which recording is carried out by discharging a recording liquid within a recording head utilizing vibration generated with a piezo oscillator, electrostatic attraction caused by applying a high electric voltage, or other driving forces. For ink-jet recording liquids, however, severer conditions are imposed on various properties than for general writing inks used for fountain pens, felt pens, or the like.

The ink-jet recording process generates low noises and permits high-speed recording and color recording onto plain paper without any particular fixing treatment, and hence various types of ink-jet recording systems are investigated energetically.

In any of these various types of recording systems, the recording liquid to be used is requested to have characteristics like the following: physical properties including viscosity and surface tension being each within a proper range; enough high dissolution stability to be used without fear of clogging any fine discharging orifice used; capability to give sufficiently dense images; and no tendency of causing a change in physical properties or of forming insoluble matter during storage.

In addition, the following properties are also required versatility such that recording can be carried out without limitation on recording members; a high rate of fixing; and capability to give images excellent in resistances to water, solvents (particularly to alcohol), light, and abrasion and in the resolving power.

However, images recorded by use of conventional recording liquids, in particular water base recording liquids, are liable to result in blotting, scratches, and fading by water adhering, mechanical friction, or light exposure. Thus, a recording liquid free from these drawbacks are intensely looked for.

Such being the case, a number of proposals have been made relating to the recording liquid, but hardly any practical recording liquid satisfying all the above-mentioned requirements has so far been given.

SUMMARY OF THE INVENTION

The object of this invention is to provide a recording liquid satisfying all the above-mentioned requirements, that is, a recording liquid, excellent in recording capability, discharge stability, and discharge responsiveness, which does not result in clogging of any discharging orifice used or any quality change or precipitation during storage, said recording liquid giving recorded images excellent in tone and contrast, and further in resistances to water, solvents, light, weather, and abrasion and in fixing property.

The recording liquid of this invention, achieving the above object, comprises a recording agent for giving recorded images and a liquid medium for dissolving or dispersing the recording agent and is characterized in that the recording agent comprises at least one of the compounds represented by the following formula (A) and at least one of the compounds represented by the following formula (B):

Formula (A)

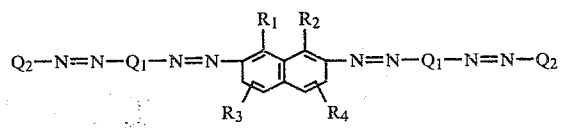

In this formula, $Q_1$ and $Q_2$ each represent benzene ring residue or naphthalene ring residue unsubstituted or substituted by amino, hydroxyl, or sulfo; $R_1$ and $R_2$ each represent hydrogen, hydroxyl, or amino; and $R_3$ and $R_4$ each represent hydrogen or sulfo in the form of salt with an alkali selected from sodium, lithium, potassium, ammonium, and amines, wherein the number of sulfo groups in the molecule is 2 to 8.

Formula (B)

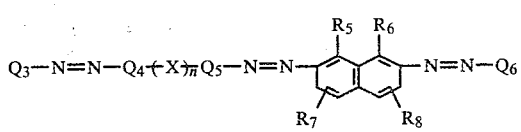

In this formula, $Q_3$ and $Q_6$ each represent phenyl or naphthyl, substituted or unsubstituted; $Q_4$ and $Q_5$ each represent 1,4-phenylene or 1,4-naphthalene, substituted or unsubstituted; $R_5$ and $R_6$ each represent hydrogen, hydroxyl, or amino; $R_7$ and $R_8$ each represent hydrogen or sulfo in the form of salt with a member selected from sodium, lithium, potassium, ammonium, and amines; X represents $-NH-$, $-N=N-$, or $-CH=CH-$; and n is 0 or 1.

DETAILED DESCRIPTION OF PREFERRED EMBODIMENTS

Such combined use of at least one of the compounds (dye) represented by formula (A) and at least one of the compounds (dye) represented by formula (B) markedly improves the dissolution stability of recording liquid components themselves, so that the resulting recording liquid is stable for a long period and excellent in discharging stability, discharge responsiveness, and continuous recording process capability even at higher concentration of dyes. The recording liquid of this invention is highly valuable in practical use also in that images recorded therein combine good resistances to water, light, abrasion, and alcohol.

The recording liquid of this invention comprises, in principle, compounds (dyes) represented by formulae (A) and (B), respectively, and a liquid medium such as water or an organic solvent. As mentioned above, the combined use of these compounds of formulae (A) and (B) markedly improves the dissolution stability to these liquid media, discharging stability, and strage stability, causing no clogging of the discharging orifice in operation after a long recess of recording.

The content of a mixture of compounds of formulae (A) and (B) used in this invention, though suitably determined according to a desired density of recorded images, the device to be used for recording, the types of other components to be added, and requested physical properties of the recording liquid, is generally 0.5 to 20%, preferably 0.5 to 15%, and particularly preferably to 1 to 10%, by weight of the total weight of recording liquid prepared.

The ratio of a compound of formula (A) to a compound of formula (B) is generally 9:1 to 1:9, preferably 8:2 to 2:8, by weight.

While compounds of formulae (A) and (B) are used as essential components of the recording liquid in this invention, a known dye can also be used therewith, including a variety of direct dyes, acid dyes, etc.

Examples of the compounds of formulae (A) and (B) are given below.

[1] Dyes represented by Formula (A)

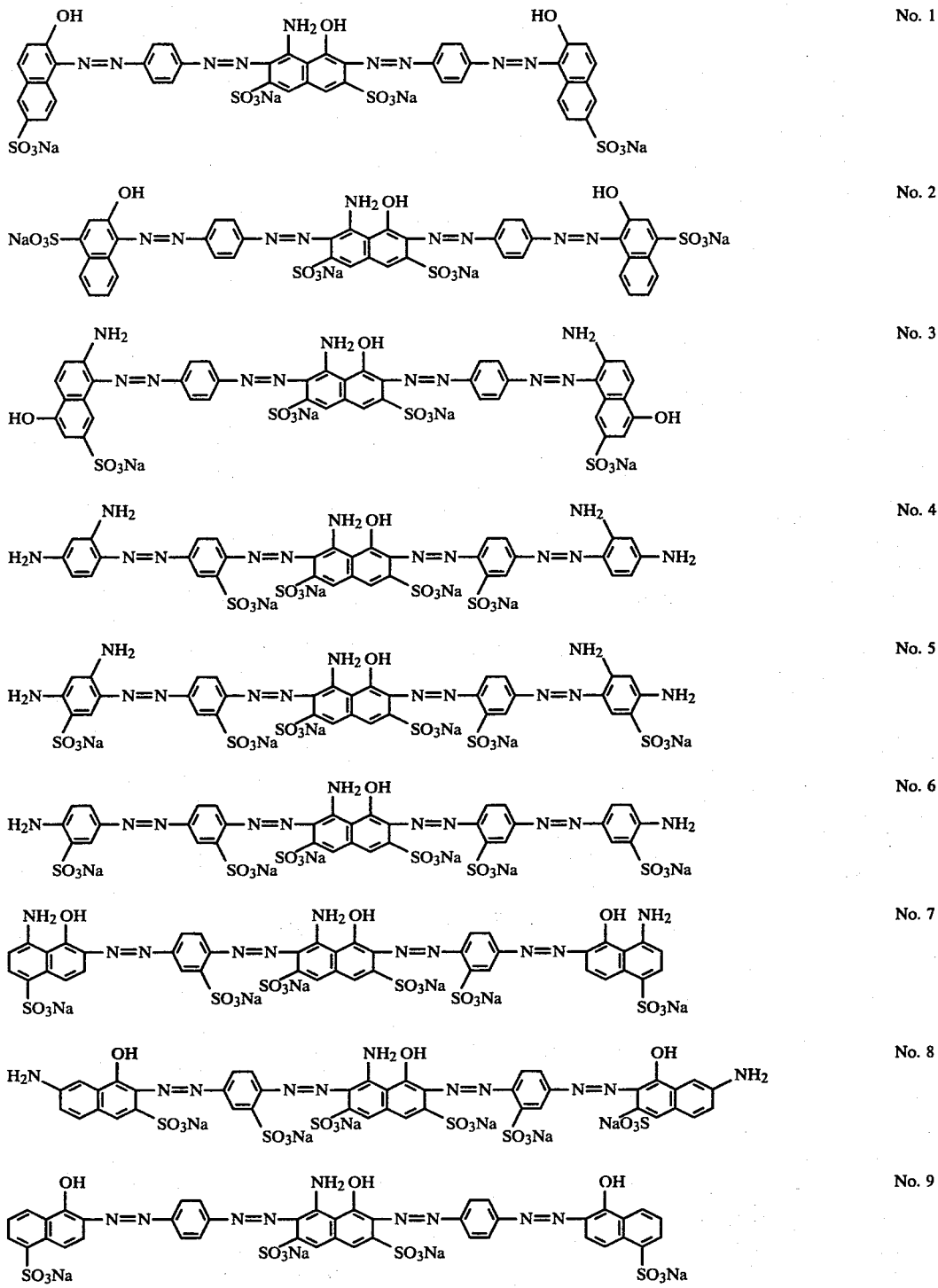

-continued
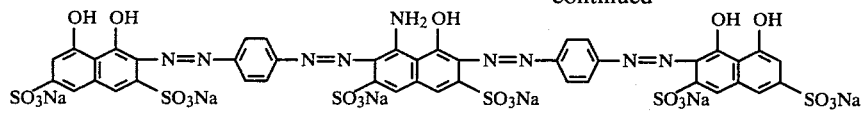 No. 10
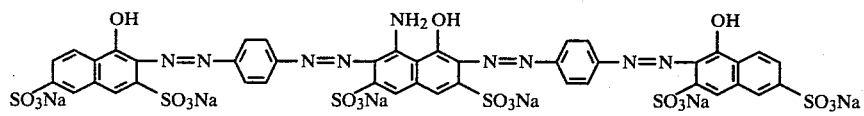 No. 11
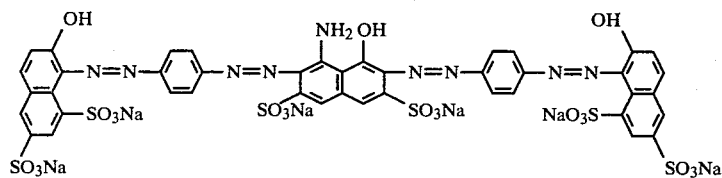 No. 12
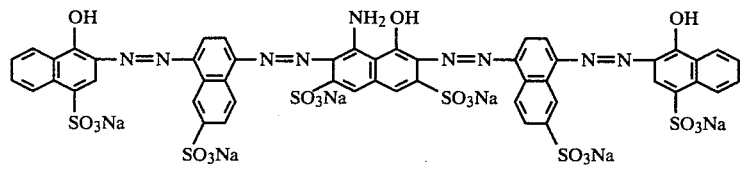 No. 13
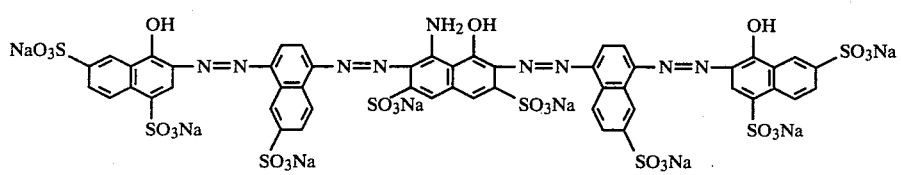 No. 14
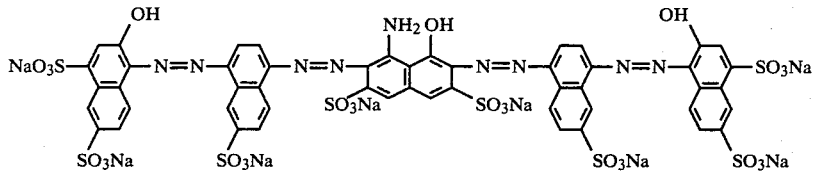 No. 15
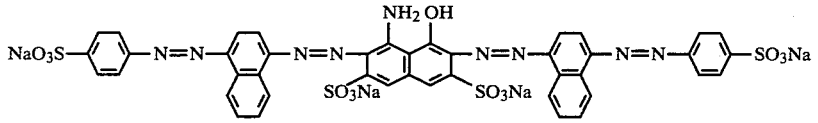 No. 16
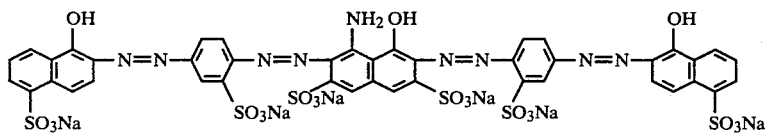 No. 17
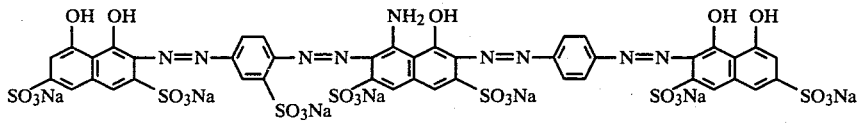 No. 18
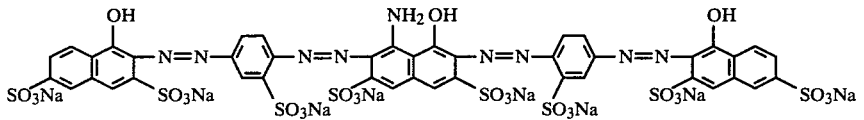 No. 19
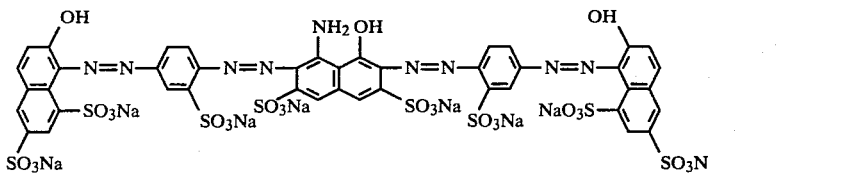 No. 20

-continued
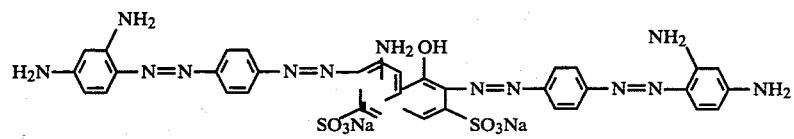 No. 21
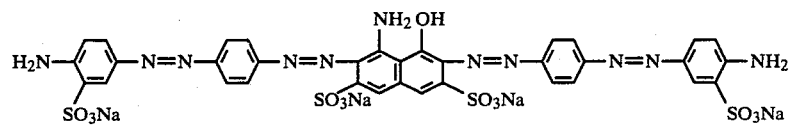 No. 22
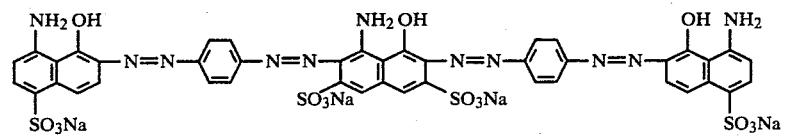 No. 23
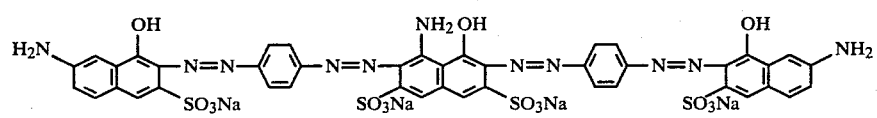 No. 24
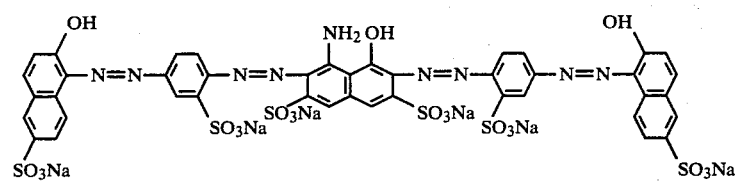 No. 25
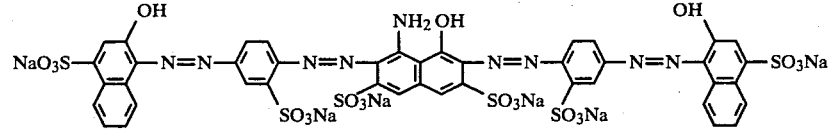 No. 26
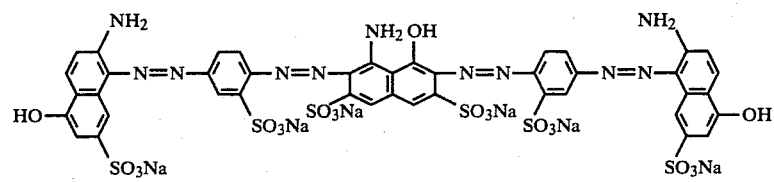 No. 27
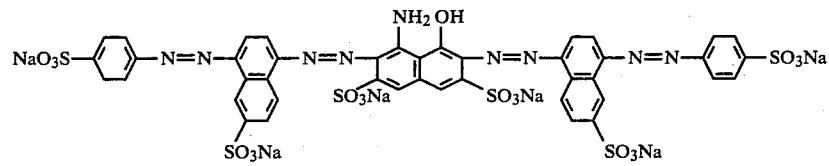 No. 28
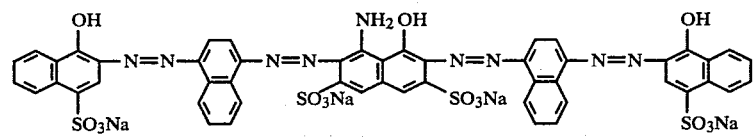 No. 29
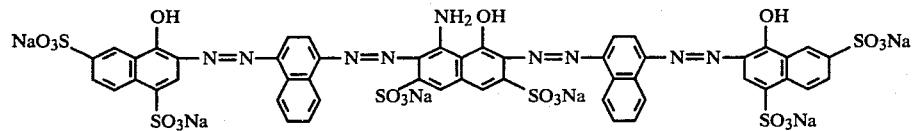 No. 30

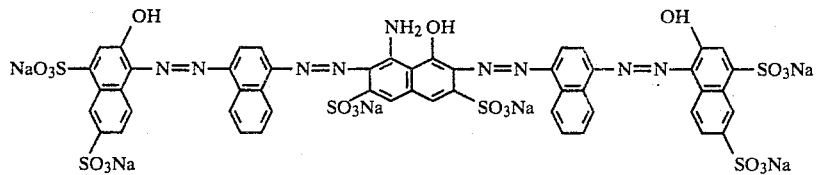
No. 31
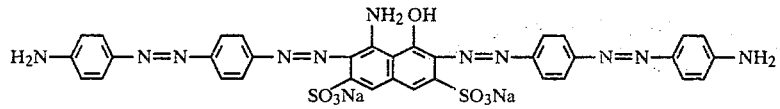
No. 32
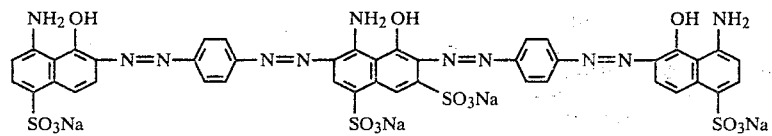
No. 33
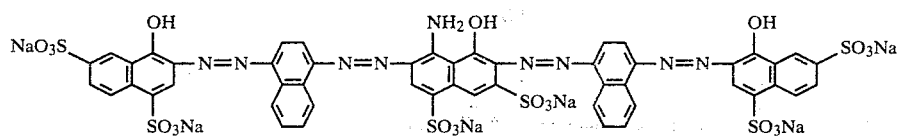
No. 34
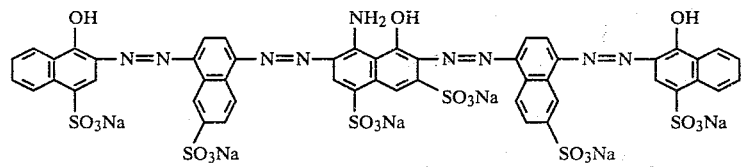
No. 35
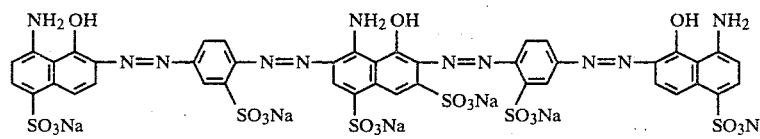
No. 36
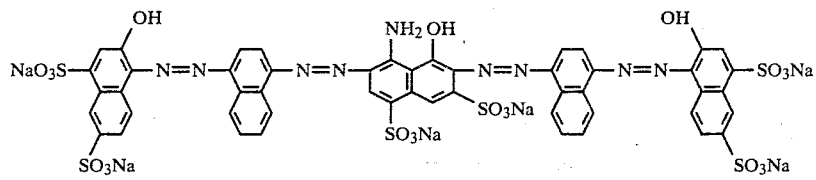
No. 37
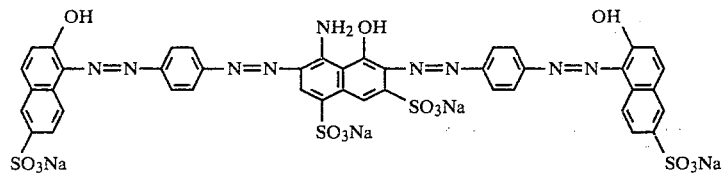
No. 38
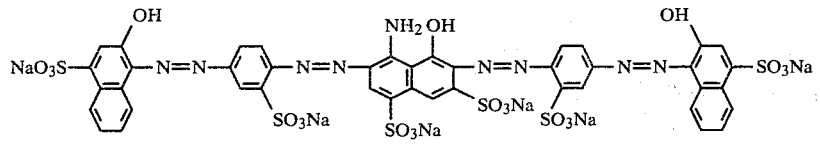
No. 39
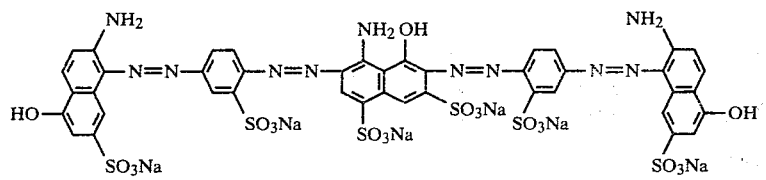
No. 40

-continued
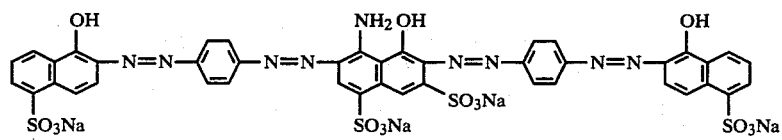
No. 41
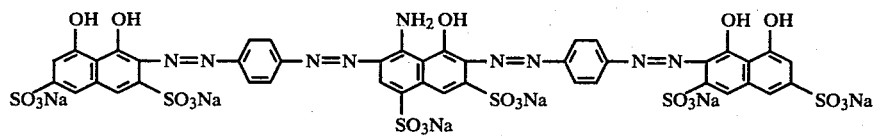
No. 42
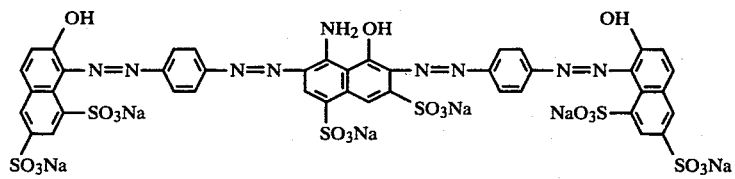
No. 43
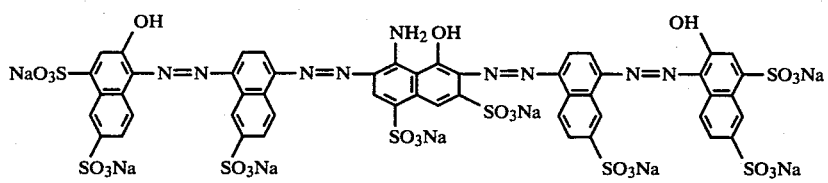
No. 44
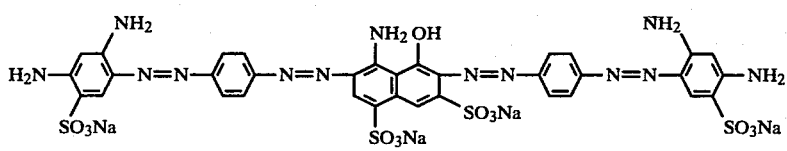
No. 45
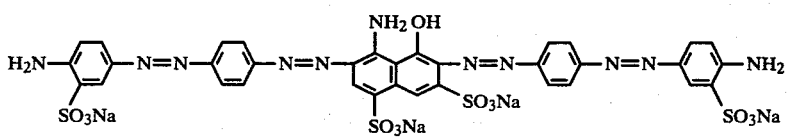
No. 46
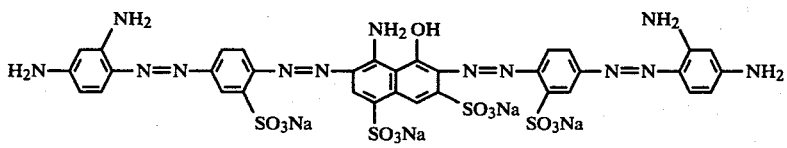
No. 47
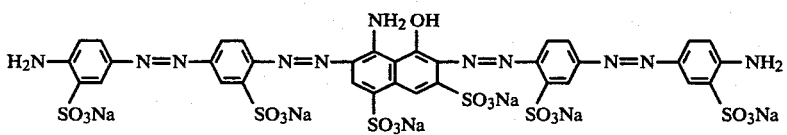
No. 48
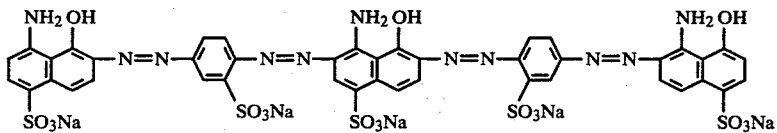
No. 49
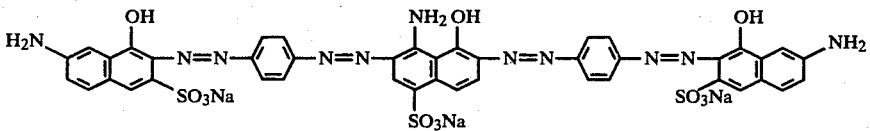
No. 50

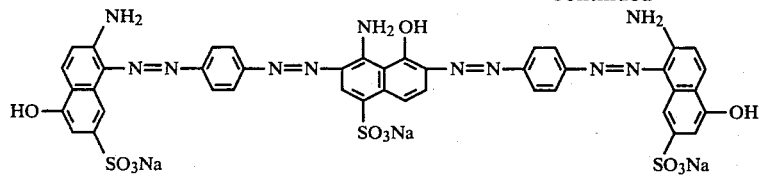 No. 51
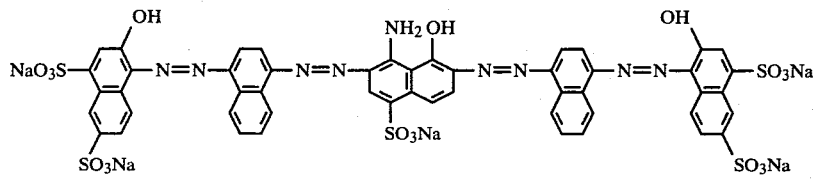 No. 52
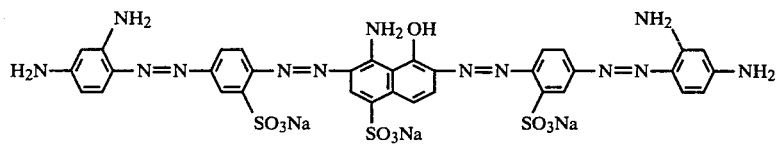 No. 53
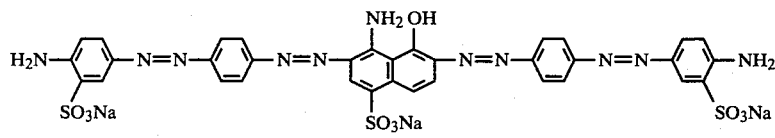 No. 54
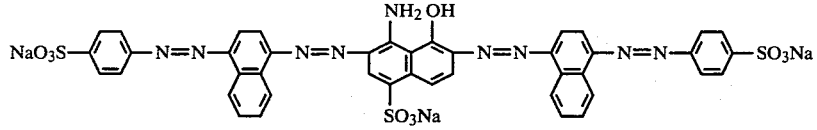 No. 55
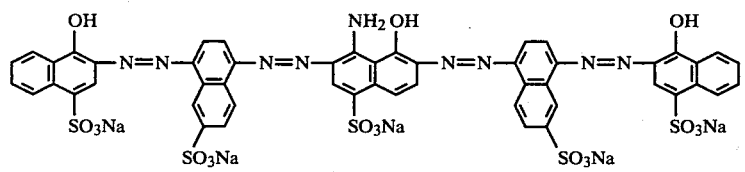 No. 56
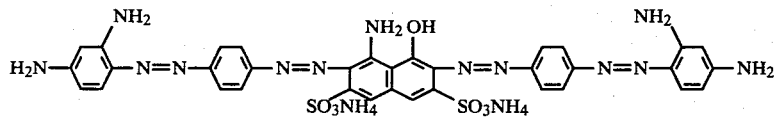 No. 57
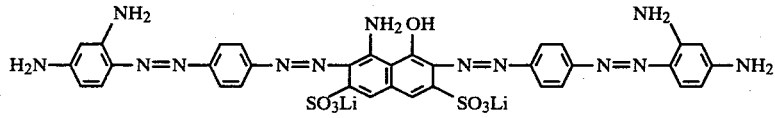 No. 58
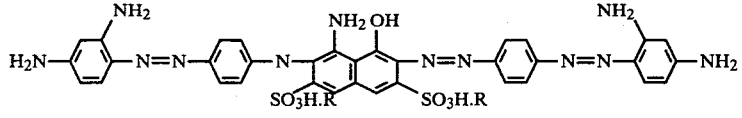 No. 59
$$\left[ \text{wherein } R = N \begin{array}{l} \diagup CH_2CH_2OH \\ - CH_2CH_2OH \\ \diagdown CH_2CH_2OH \end{array} \right]$$
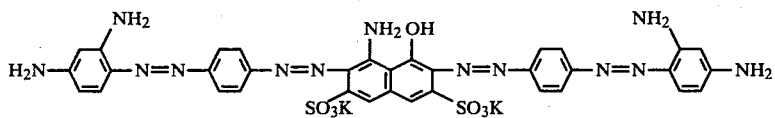 No. 60

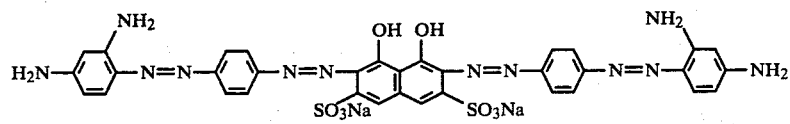
No. 61
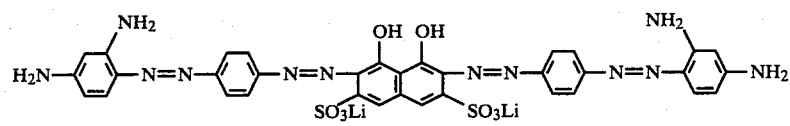
No. 62
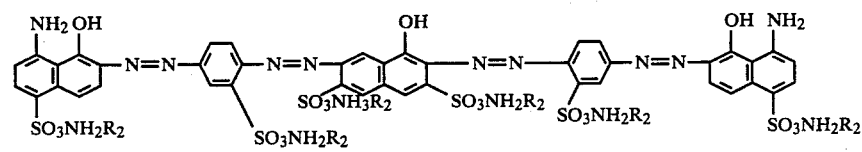
No. 63
[wherein .R = —(CH₂)₃CH₃]
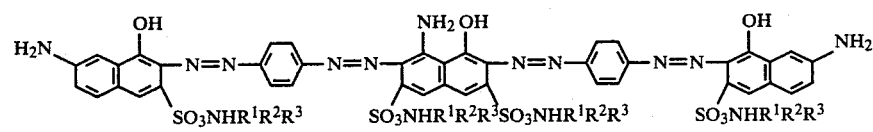
No. 64
$$\begin{array}{l} R^1 = -CH_3 \\ \text{wherein } .R^2 = -CH_2CH_3 \\ R^3 = -(CH_2)_3CH_3 \end{array}$$
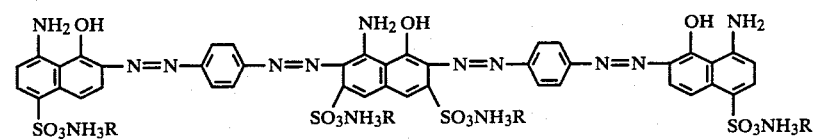
No. 65
[wherein .R = —(CH₂)₅CH₃]
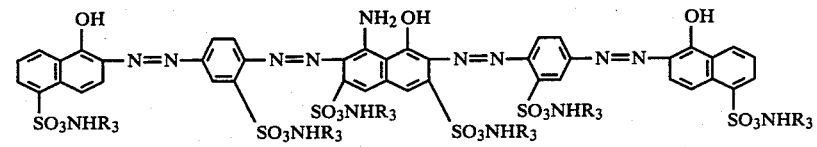
No. 66
[wherein .R = —CH₂CH₂OH]
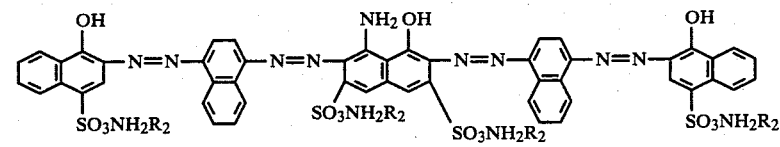
No. 67
[wherein .R = —CH₂CH₃]
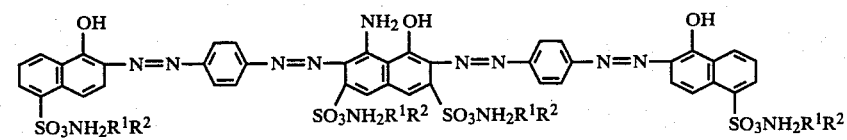
No. 68
$$\text{wherein } \begin{array}{l} R^1 = -CH_3 \\ R^2 = -CH_2CH_3 \end{array}$$

-continued
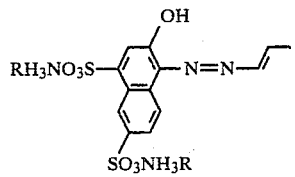 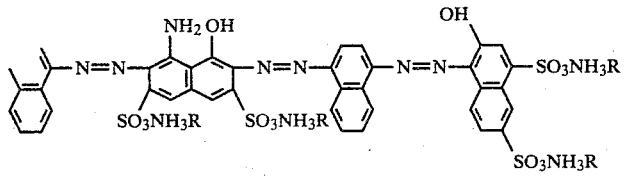
No. 69
[wherein .R = —(CH₂)₅CH₃]
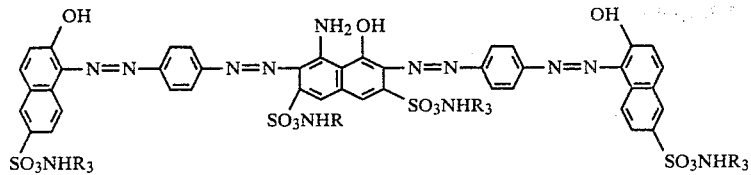
No. 70
[wherein .R = —CH₃]
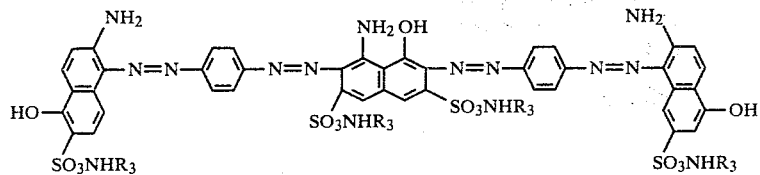
No. 71
[wherein .R = —(CH₂)₂CH₃]
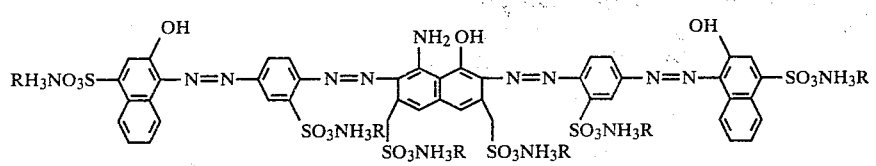
No. 72
[wherein .R = —CH₂—⟨S⟩]
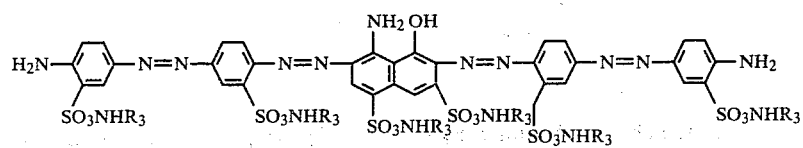
No. 73
[wherein .R = —CH₃]
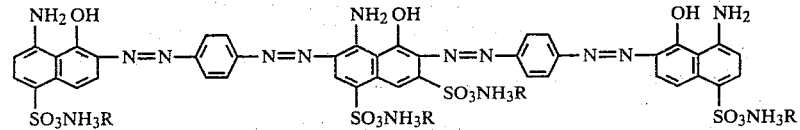
No. 74
[wherein .R = —(CH₂)₂CH₃]
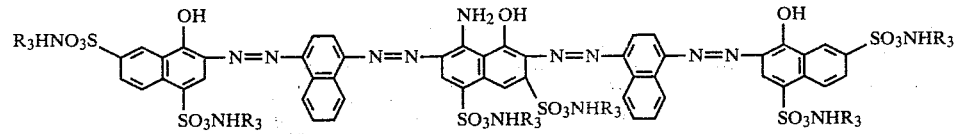
No. 75
[wherein .R = —CH₂CH₂OH]
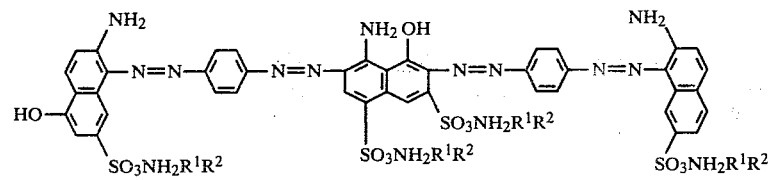
No. 76

[wherein . $R^1 = -CH_3$, $R^2 = -CH_2CH_3$]

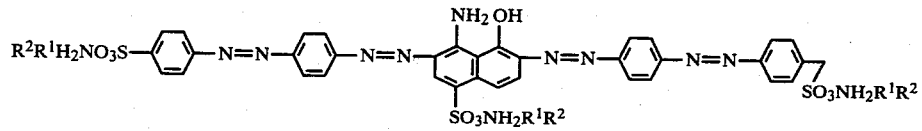
No. 77

[wherein . $R^1 = -CH_2CH_2CH_3$, $R^2 = -CH_2CH_3$]

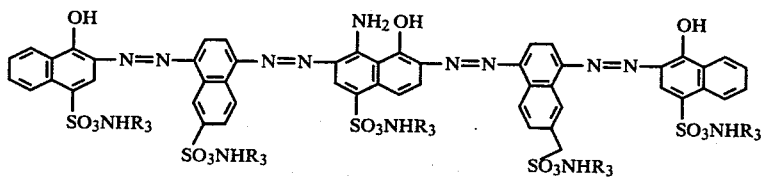
No. 78

[wherein .R = $-(CH_2)_3CH_3$[

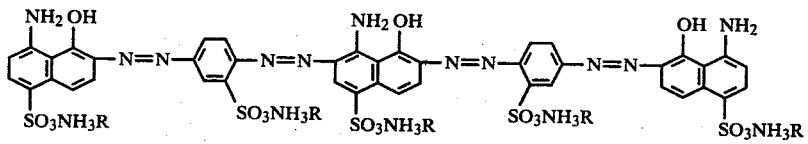
No. 79

[wherein .R = $-CH_2CH_2OH$]

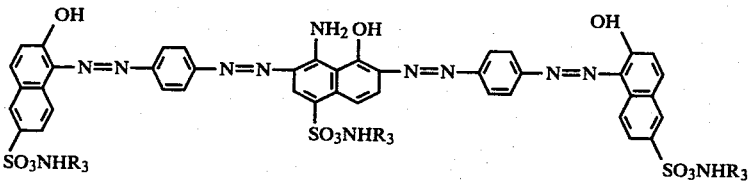
No. 80

[wherein .R = $-CH_3$]

Among the above-cited compounds, those of which sulfo groups have a structure of quaternary ammonium salt are excellent in dissolution stability when a recording liquid contains a large quantity of a water-miscible organic solvent which will be mentioned later.

Moreover, it is desired to use those compounds, among the above-cited ones, which satisfy the conditions that (a) $R_3$ and $R_4$ each are a sulfo group in the form of sodium salt or quaternary ammonium salt, $R_2$ is hydrogen, (b) $Q_1$ is a phenylene group unsubstituted or substituted by sulfo, (c) $Q_2$ is a phenylene or naphthylene group substituted by amino or hydroxyl, (d) the number of said sulfo groups in a molecule is 2 to 8, preferably 2 to 6. Examples of these compounds are Nos. 1–5, 9–12, 21–24, 32, 53, 57–59, 65, 66, 70 and 71, etc., which are preferable components of the recording liquid of this invention.

[II] Dyes represented by Formula (B)

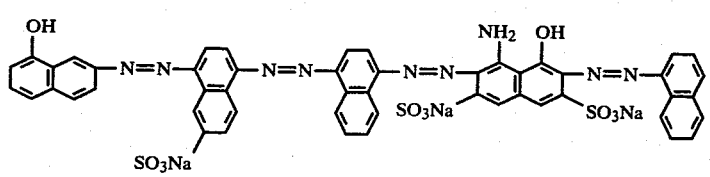
No. 81

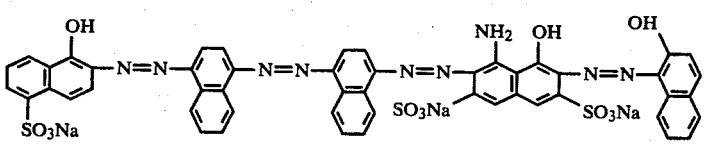
No. 82

-continued
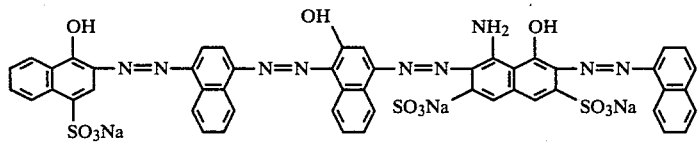 No. 83
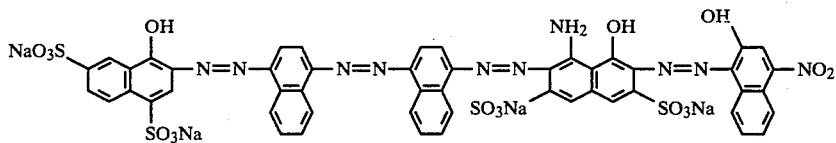 No. 84
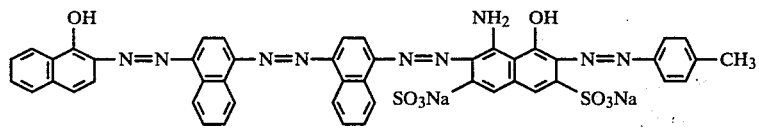 No. 85
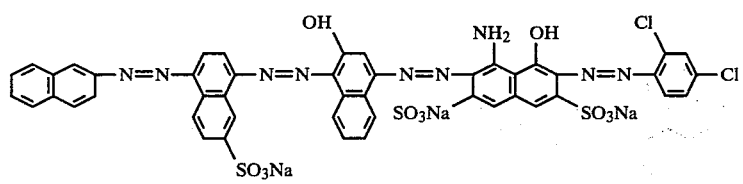 No. 86
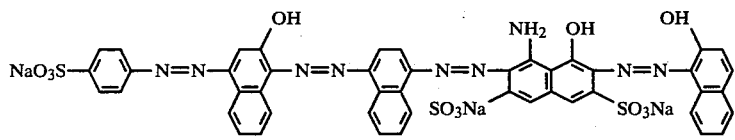 No. 87
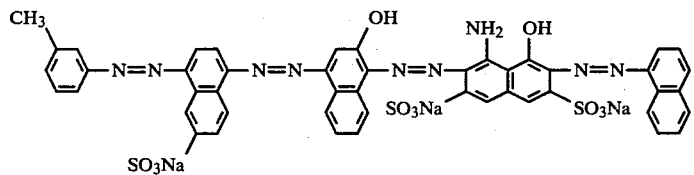 No. 88
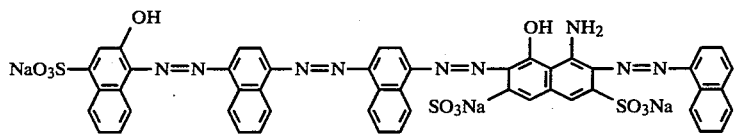 No. 89
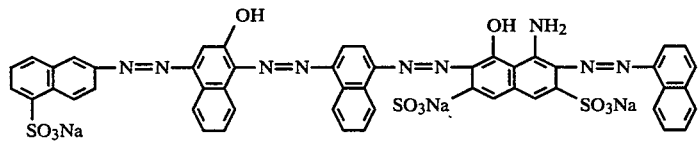 No. 90
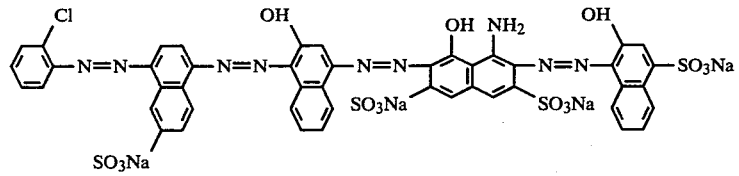 No. 91
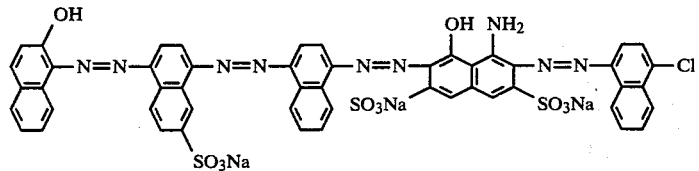 No. 92

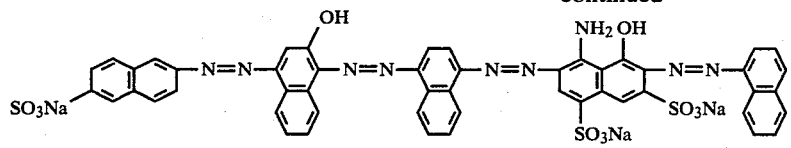 No. 93
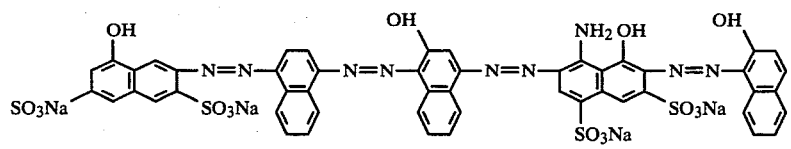 No. 94
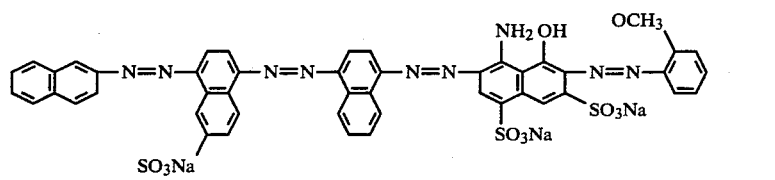 No. 95
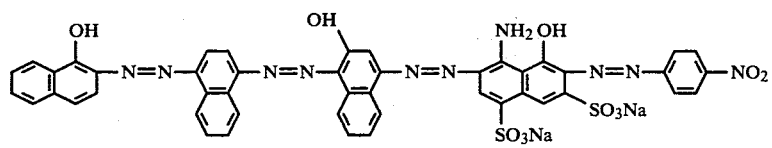 No. 96
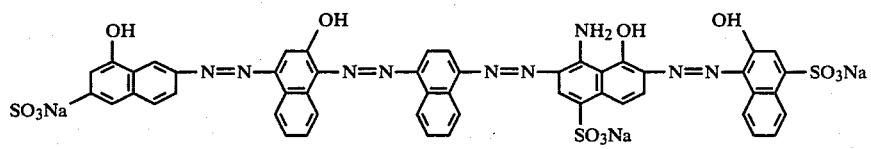 No. 97
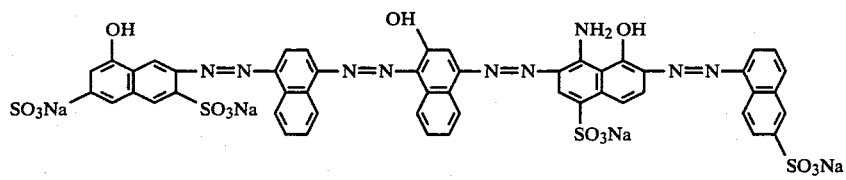 No. 98
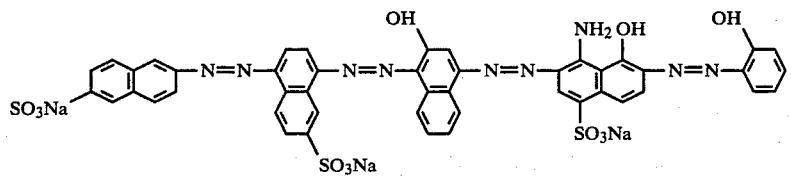 No. 99
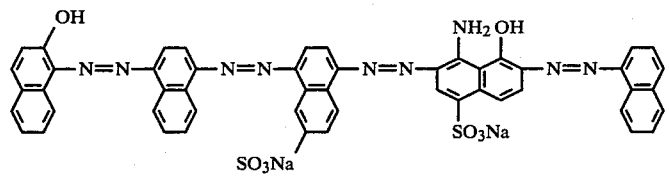 No. 100
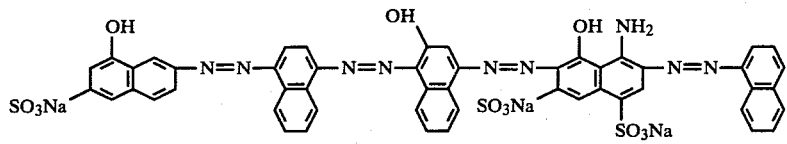 No. 101
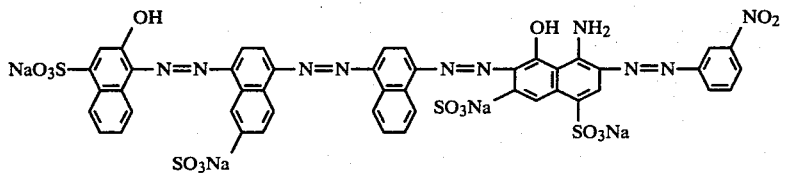 No. 102

-continued
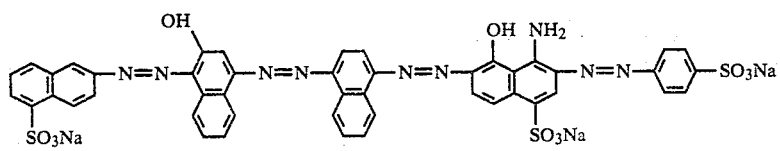
No. 103
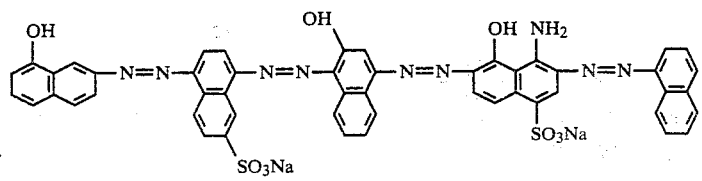
No. 104
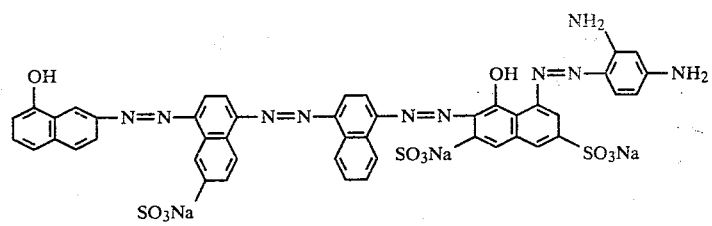
No. 105
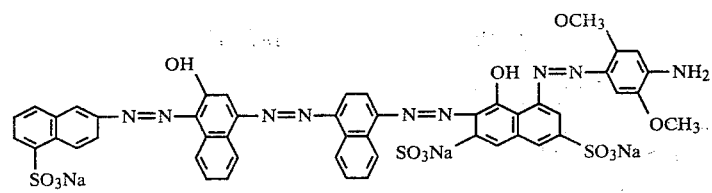
No. 106
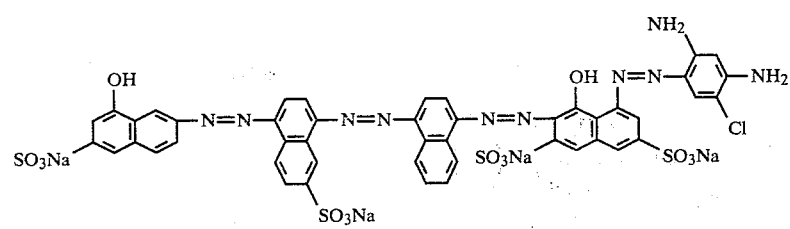
No. 107
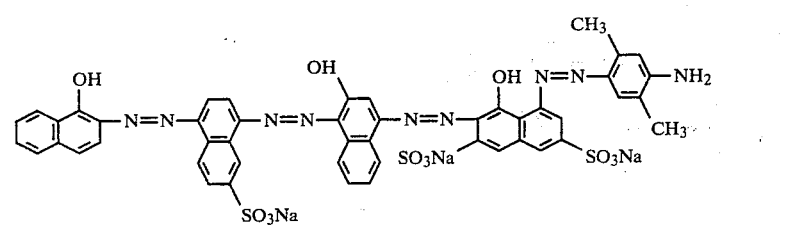
No. 108
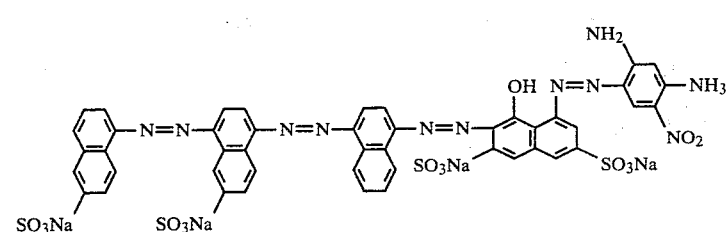
No. 109
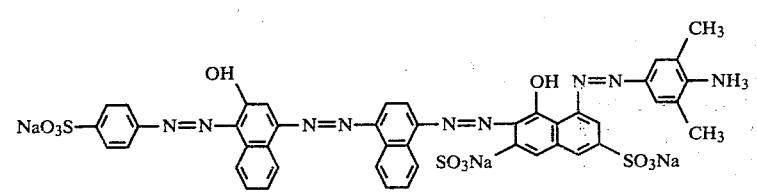
No. 110

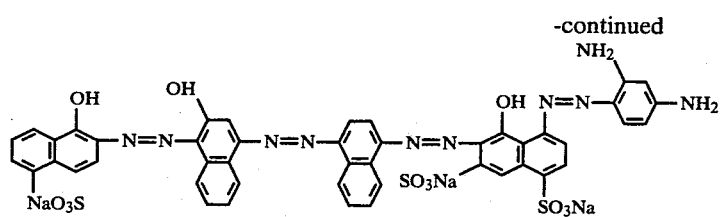 No. 111
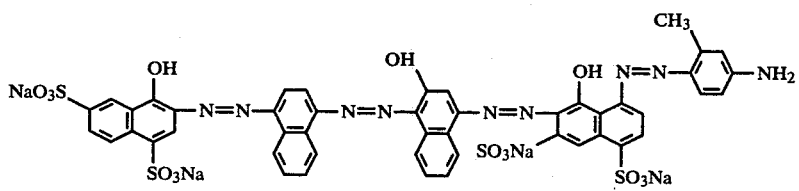 No. 112
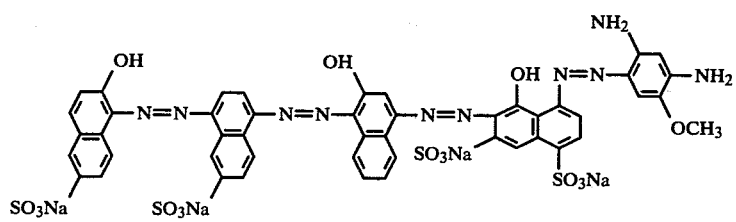 No. 113
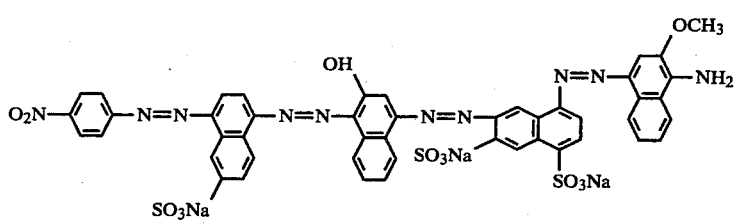 No. 114
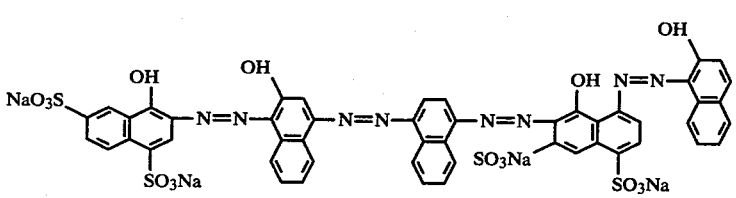 No. 115
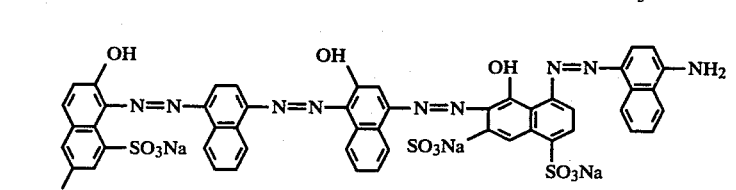 No. 116
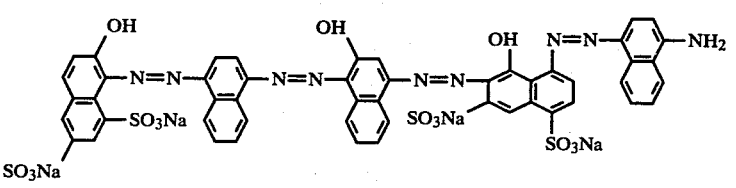 No. 117
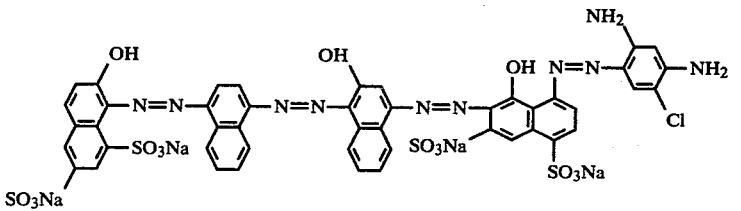 No. 118

-continued
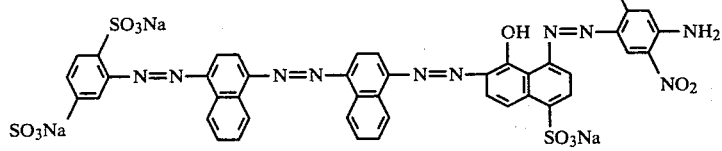
No. 119
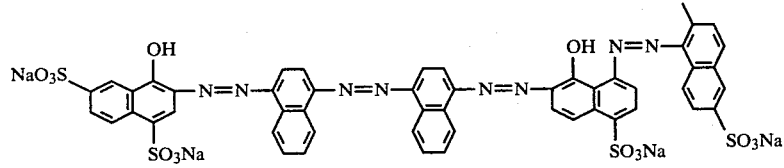
No. 120
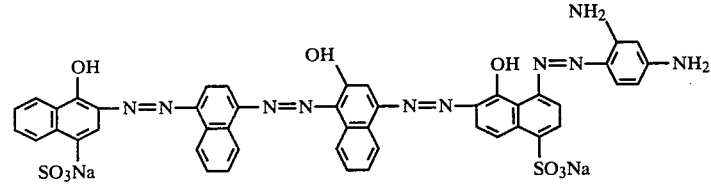
No. 121
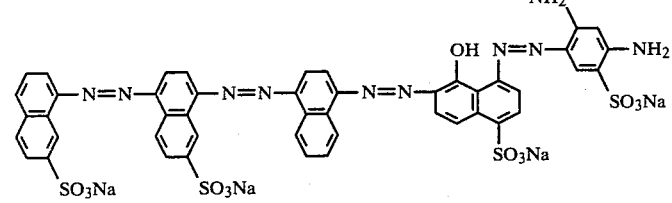
No. 122
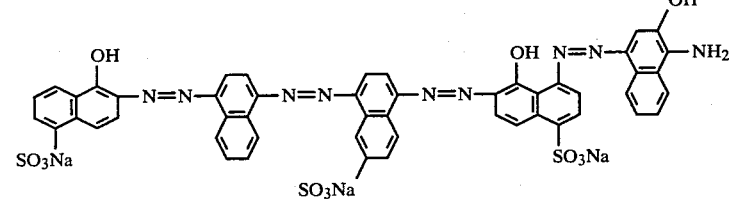
No. 123
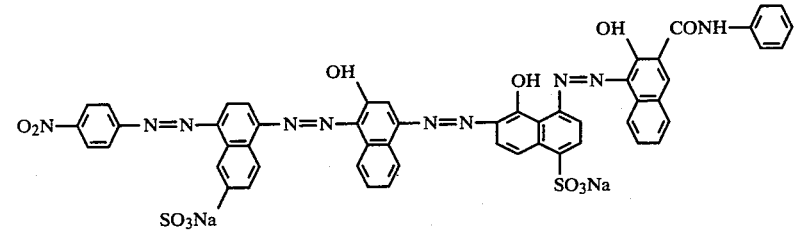
No. 124
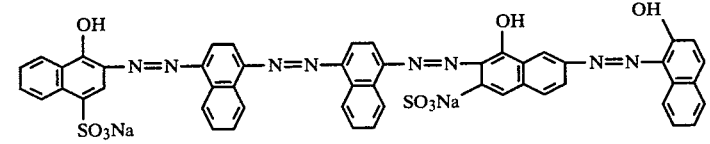
No. 125
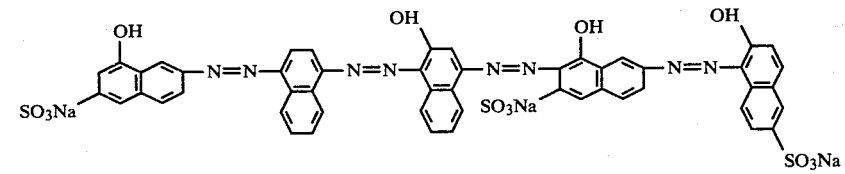
No. 126

-continued
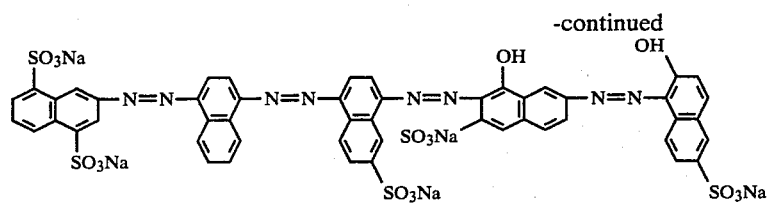
No.127
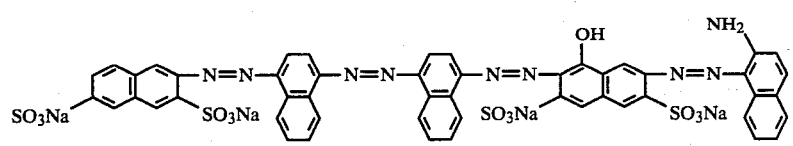
No. 128
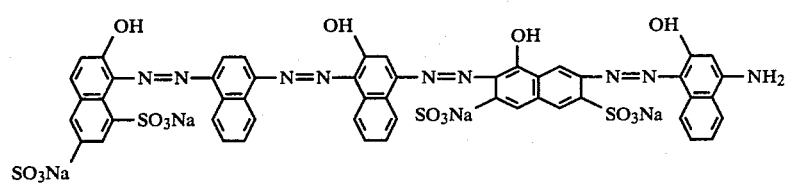
No. 129
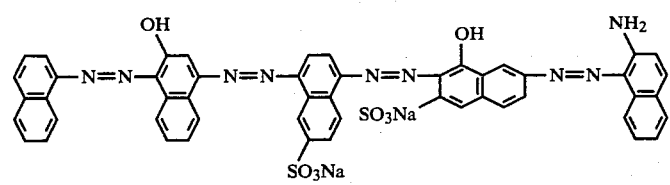
No. 130
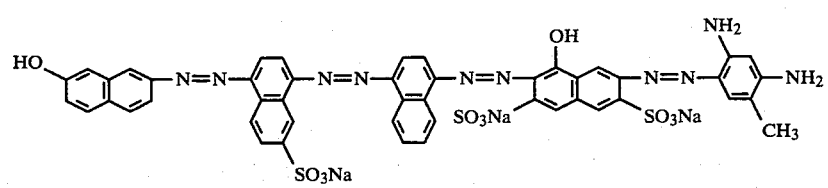
No. 131
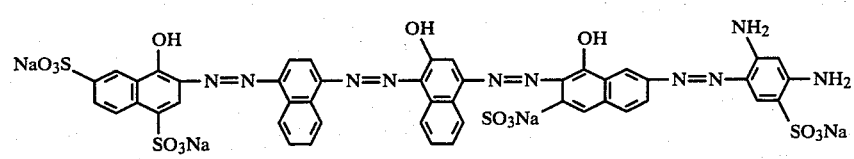
No. 132
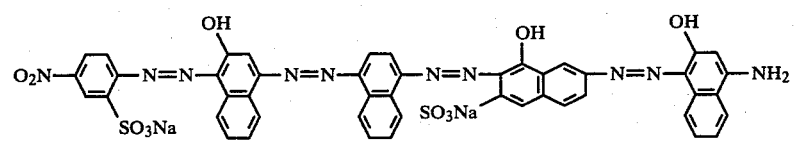
No. 133
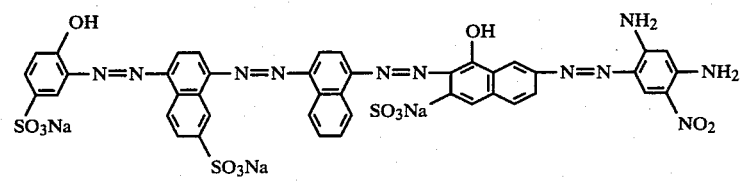
No. 134
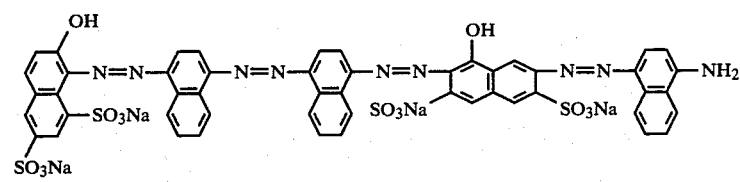
No. 135
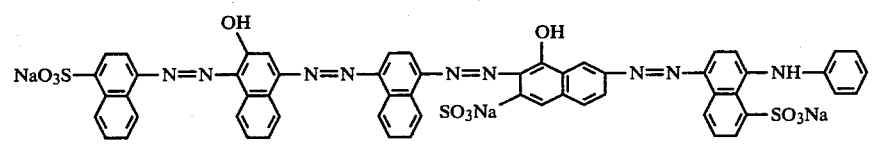
No. 136

-continued
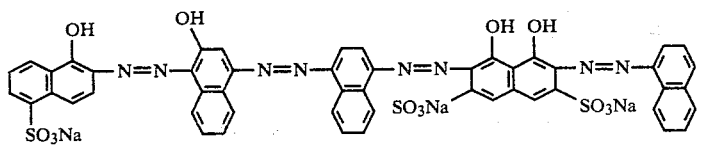 No. 137
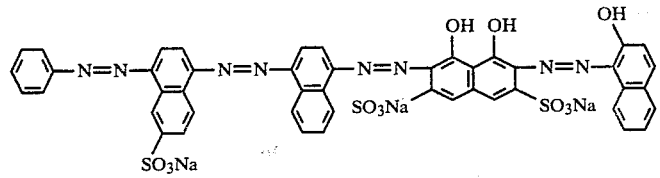 No. 138
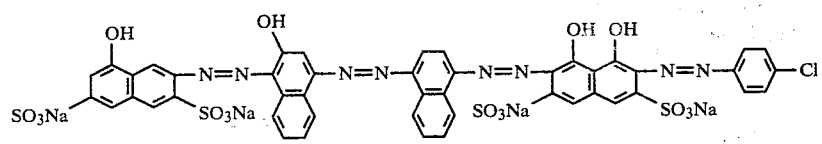 No. 139
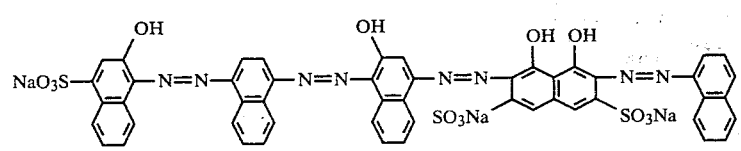 No. 140
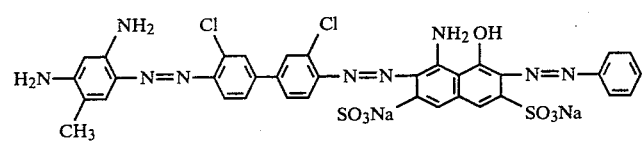 No. 141
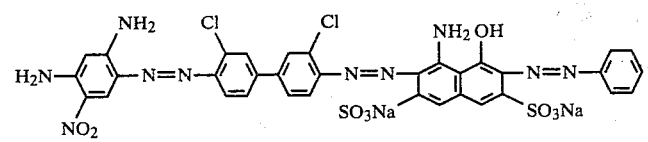 No. 142
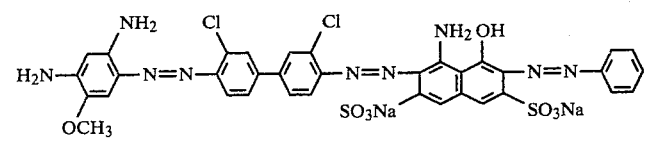 No. 143
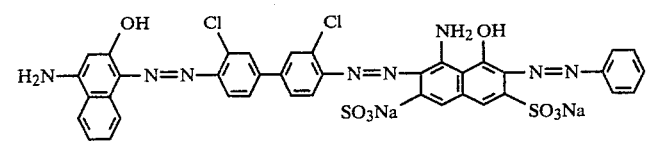 No. 144
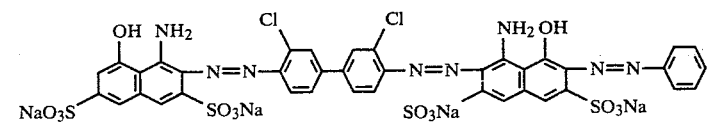 No. 145
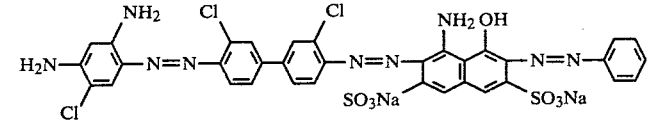 No. 146
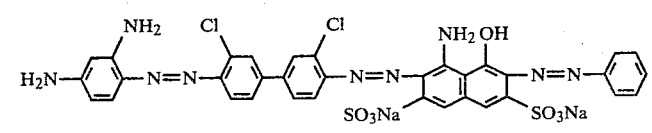 No. 147

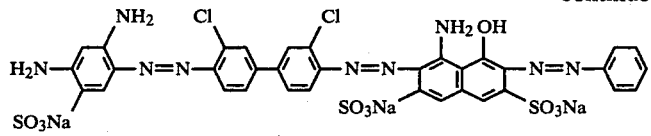 No. 148
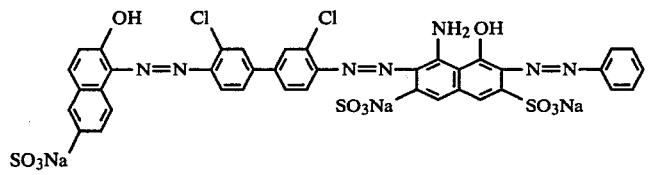 No. 149
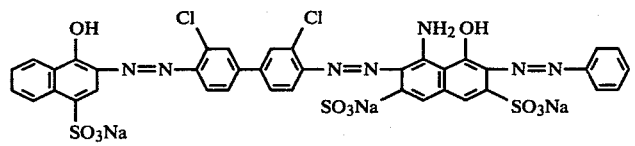 No. 150
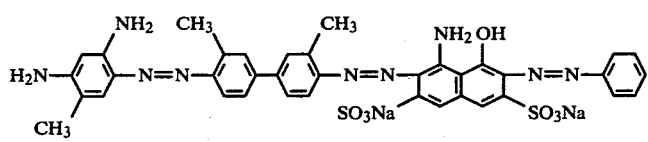 No. 151
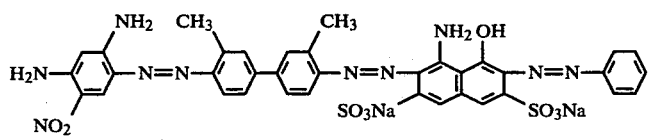 No. 152
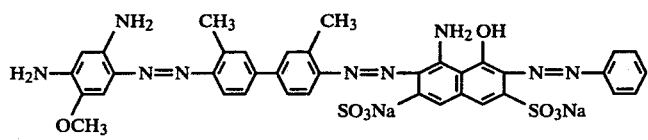 No. 153
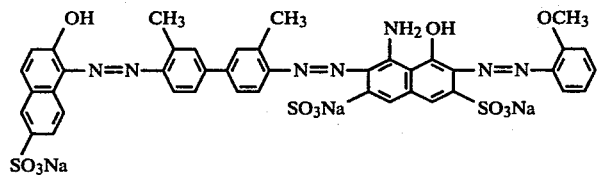 No. 154
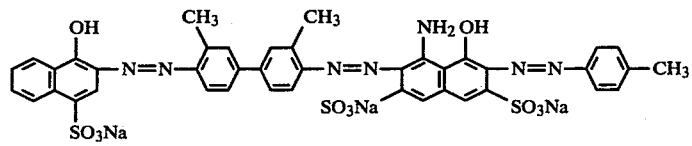 No. 155
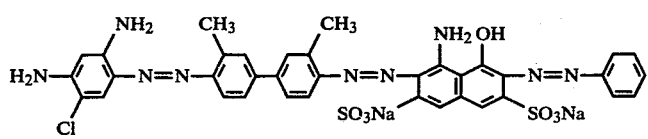 No. 156
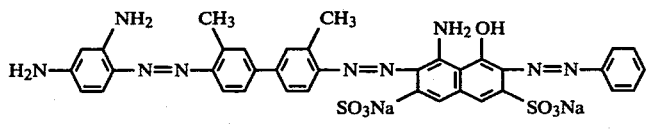 No. 157
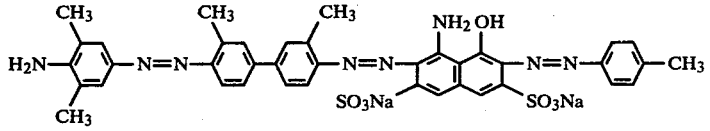 No. 158

-continued
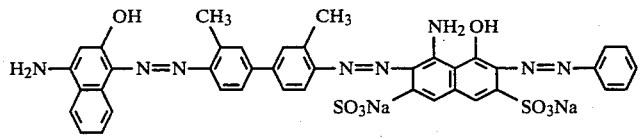 No. 159
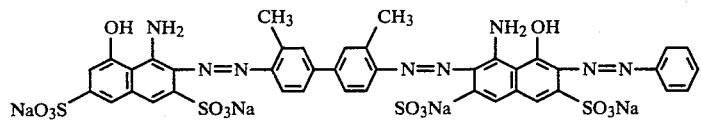 No. 160
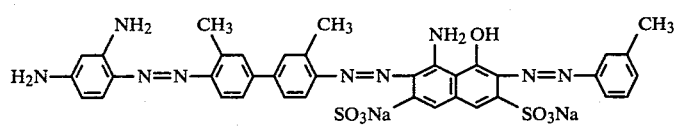 No. 161
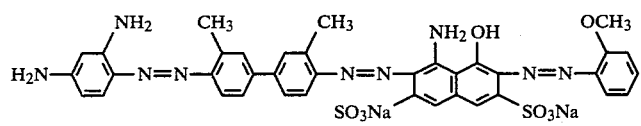 No. 162
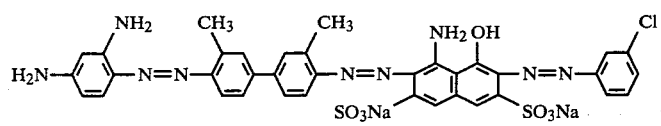 No. 163
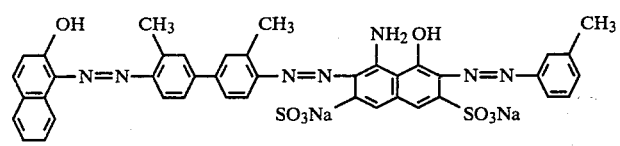 No. 164
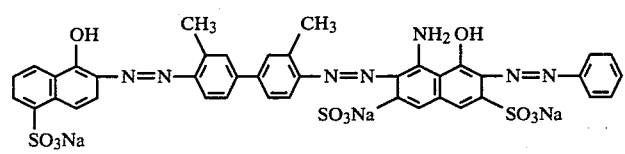 No. 165
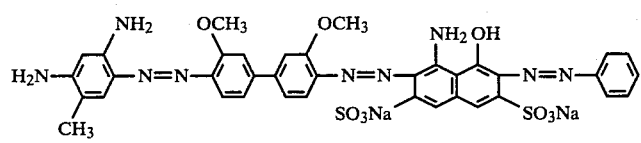 No. 166
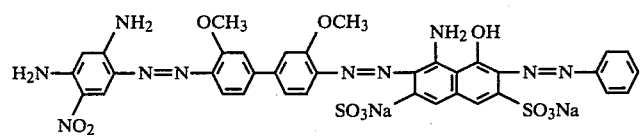 No. 167
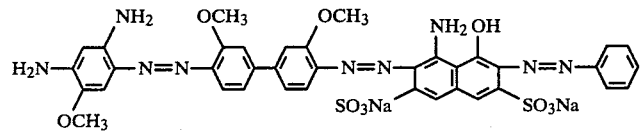 No. 168
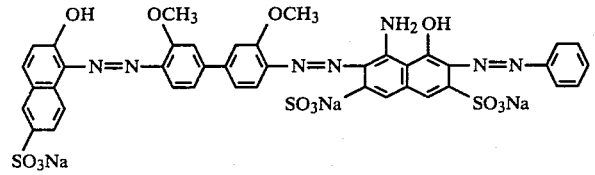 No. 169

-continued
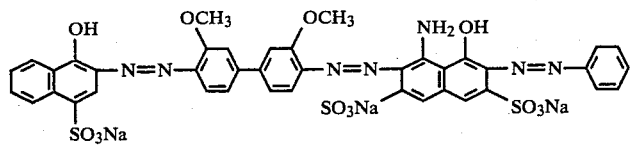
No. 170
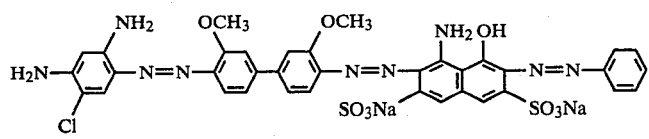
No. 171
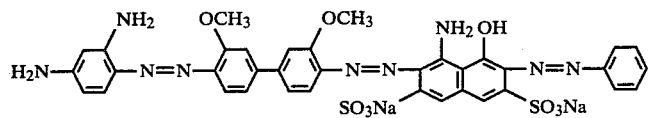
No. 172
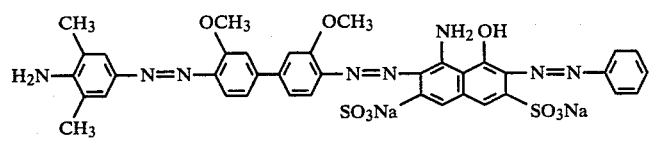
No. 173
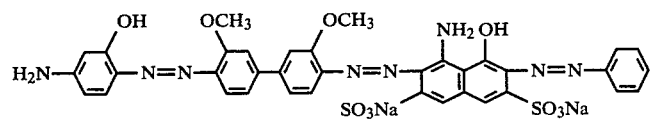
No. 174
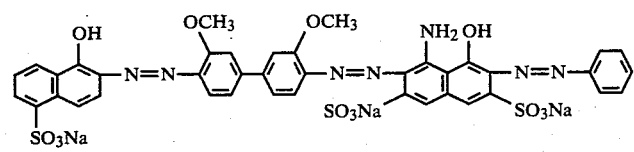
No. 175
No. 176
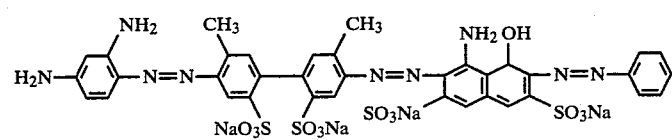
No. 177
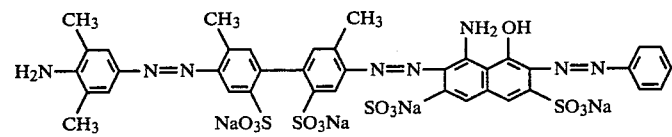
No. 178
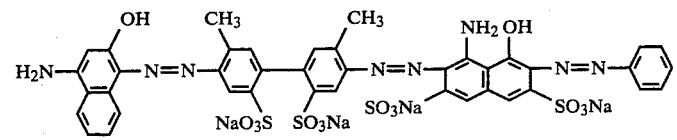
No. 179
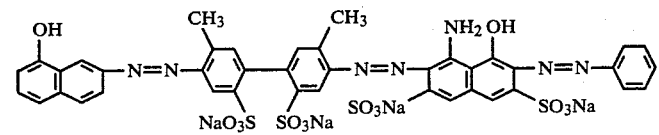
No. 180

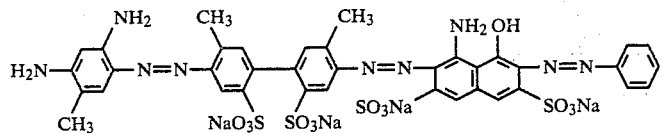
No. 181
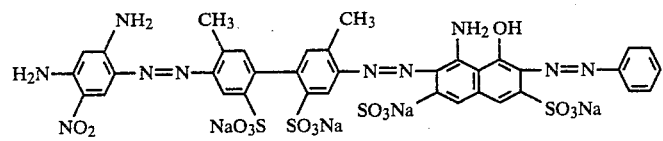
No. 182
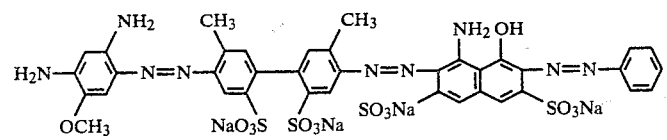
No. 183
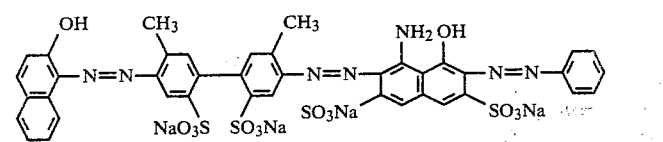
No. 184
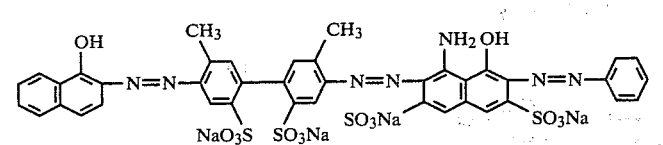
No. 185
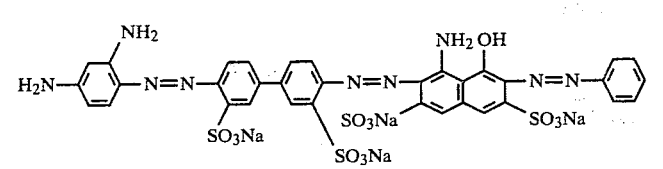
No. 186
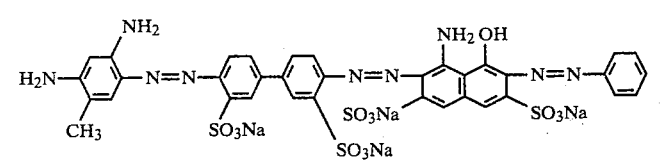
No. 187
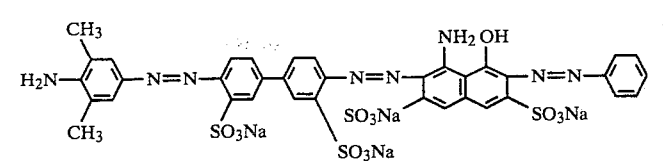
No. 188
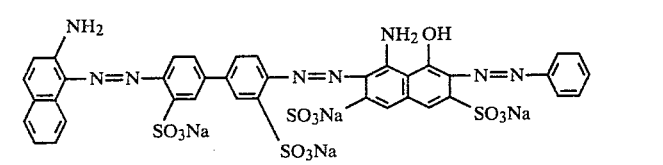
No. 189
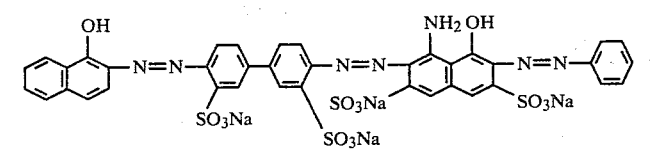
No. 190
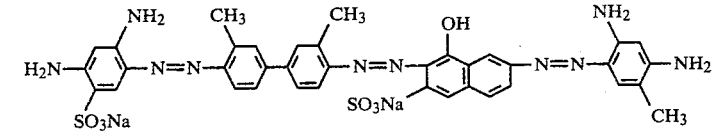
No. 191

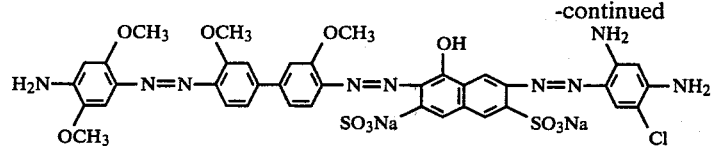 No. 192
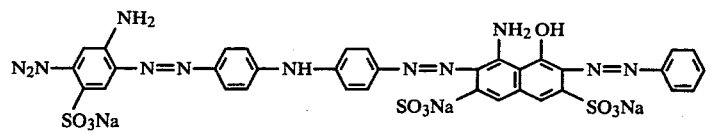 No. 193
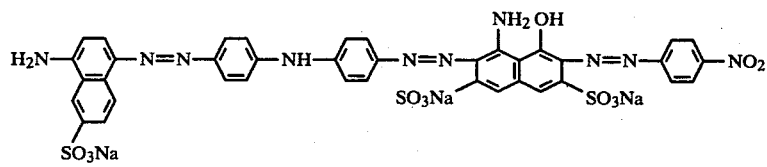 No. 194
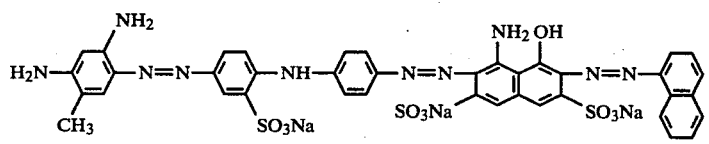 No. 195
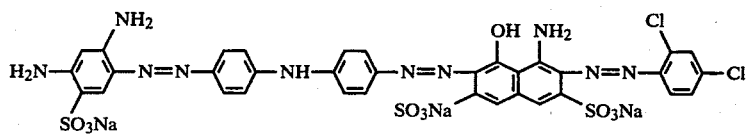 No. 196
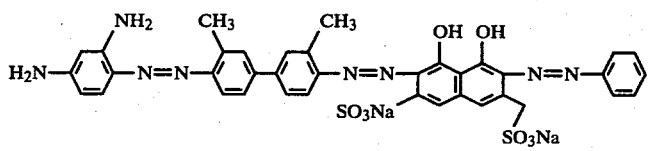 No. 197
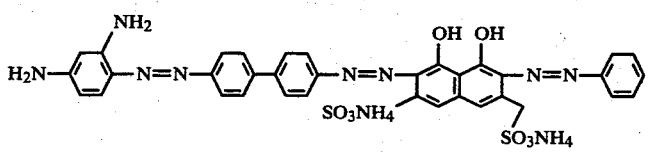 No. 198
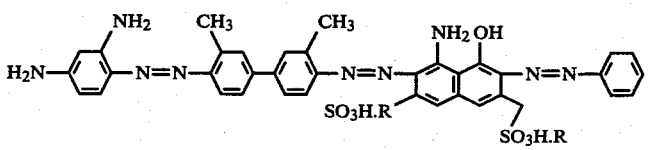 No. 199
$$\left[\text{wherein } .R = N\begin{matrix}\text{CH}_2\text{CH}_2\text{OH}\\\text{CH}_2\text{CH}_2\text{OH}\\\text{CH}_2\text{CH}_2\text{OH}\end{matrix}\right]$$
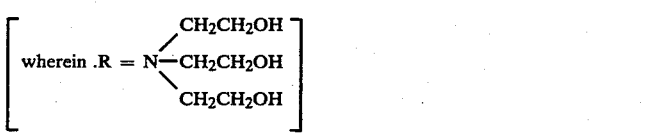 No. 200
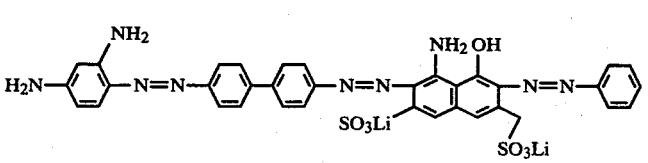 No. 201

-continued
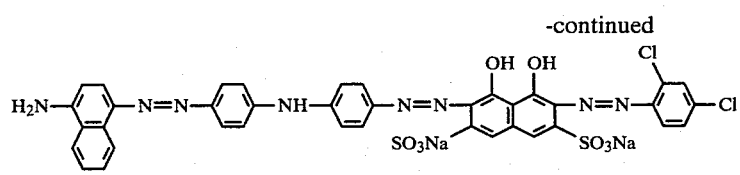 No. 202
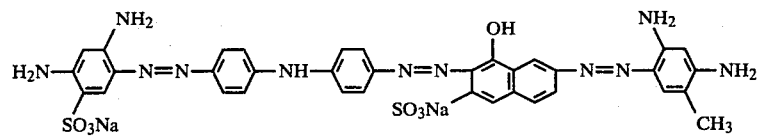 No. 203
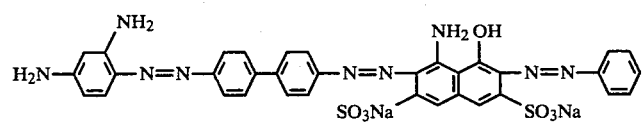 No. 204
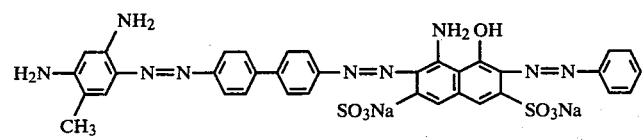 No. 205
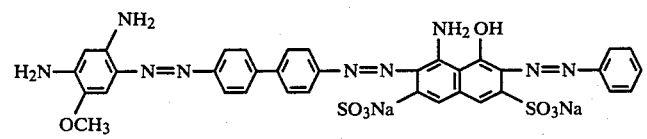 No. 206
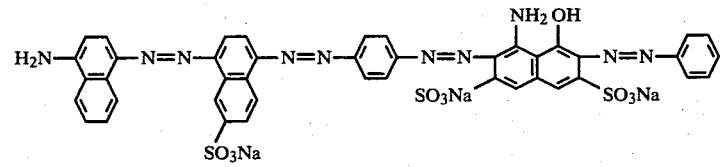 No. 207
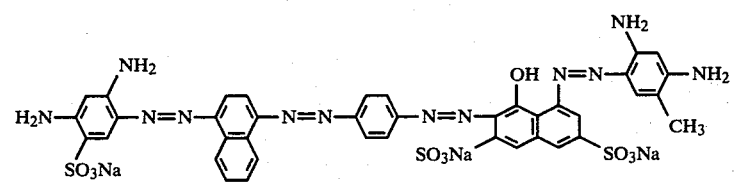 No. 208
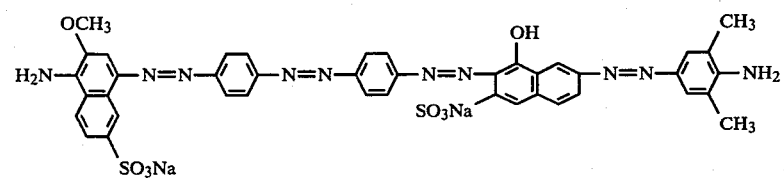 No. 209
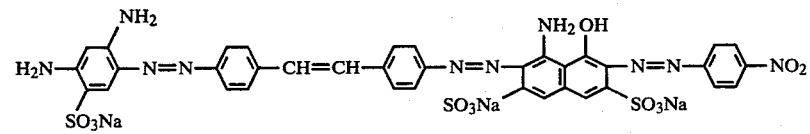 No. 210
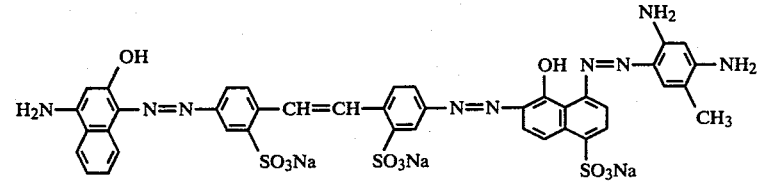 No. 211

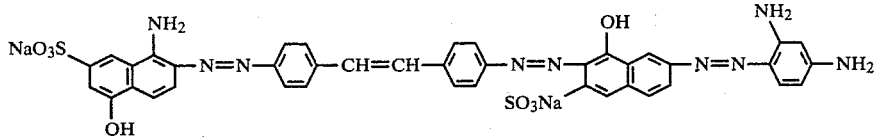

No. 212

Among the above-cited compounds, the compounds represented by the following formula (B)' are suited in particular for a dye of the recording liquid of this invention:

Formula (B)'

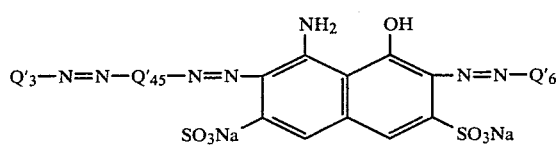

In this formula, $Q'_3$ represents phenyl or naphthyl, substituted or unsubstituted; $Q'_{45}$ represents substituted or unsubstituted 4,4'-biphenylene; and $Q'_6$ represents substituted or unsubstituted phenyl.

Among the compounds represented by formula (B)', those compounds are preferable of which $Q'_3$, $Q'_{45}$, and $Q'_6$ each are substituted by a radical selected from hydroxyl, amino, methoxy, nitro, chlorine, and —SO$_3$Na. Examples thereof are compounds Nos. 141, 143–145, 147–151, 153–155, 157, 159–162, 164–166, 168–170, 172, 174, 175, 177, 179–181, 183–187, 197–200, 204–206, etc.

Combined use of the compound of formula (A) and the compound of formula (B), mentioned above, gives a recording liquid markedly improved, as compared with the cases of separate use of these compounds, in the dissolution stability to the liquid medium. Further, the discharging stability, in particular discharge performance characteristics after a long period standing or at low operation temperatures, and the frequency response characteristics are found surprisingly improved in the case of combined use of these compounds for ink-jet recording, as compared with the cases of separate use thereof.

For the liquid medium of the recording liquid of this invention, water or mixtures of water and various types of water-miscible organic solvents are particularly desired.

These water-miscible solvents include, for example, alcohols of C$_1$–C$_4$ alkyl such as methanol, ethanol, n-propanol, isopropanol, n-butanol, sec-butanol, tert-butanol, and isobutanol; amides such as dimethylformamide and dimethylacetamide; ketones or ketone alcohols such as acetone or diacetone alcohol; ethers such as tetrahydrofuran and dioxane; nitrogen-containing heterocyclic ketones such as N-methyl-2-pyrrolidone and 1,3-dimethyl-2-imidazolydinone; polyalkylene glycols such as polyethylene glycol and polypropylene glycol; alkylene glycols containing 2-6 carbon atoms such as ethylene glycol, propylene glycol, butylene glycol, triethylene glycol, 1,2,6-hexanetriol, thiodiglycol, hexylene glycol, and diethylene glycol; glycerol; and lower alkyl ethers of polyhydric alcohol such as ethylene glycol methyl ether, diethylene glycol methyl (or ethyl) ether, and triethylene glycol monomethyl (or monoethyl) ether.

Preferred ones of these various water-miscible organic solvents are diethylene glycol—a polyhydric alcohol—and triethylene glycol monomethyl (or monoethyl) ether—a lower alkyl ether of polyhydric alcohol.

The content of said water-miscible organic solvent in the recording liquid ranges generally from 5 to 95%, desirably from 10 to 80%, and preferably from 20 to 50%, by weight of the total weight of recording liquid.

The recording liquid of such compositions of this invention is excellent and good-balanced, as a recording liquid for usual writing as well as for ink-jet recording, in recording performance characteristics such as signal response, discharging stability, and liquid droplets-forming stability in particular during a long hour continuous recording or at restarting of recording after a long period of recess, dissolution stability of recording agent and storage stability, fixing properties for recording members such as paper, and various resistances of recorded images to light, weather, water, alcohol, etc. In order to further improve these characteristics, various known additives can be additionally incorporated into the recording liquid. Such additives are, for example, viscosity regulation agent such as poly(vinyl alcohol), cellulose derivatives, and water-soluble resins; various types of surfactants, cationic, anionic, or nonionic; surface tension modifiers such as diethanolamine and triethanolamine; and buffer solutions for pH adjustment.

For preparation of a recording liquid to be used for a recording process wherein the recording liquid is discharged by electric charging, a specific-resistance-adjusting agent is used including inorganic salts such as lithium chloride, ammonium chloride, and sodium chloride. Urea or thiourea is favorably used for improving the water retentivity at the tip of the discharge orifice. In the case of a recording process wherein the recording liquid is discharged by the action of thermal energy, thermal properties such as specific heat, thermal expansion coefficient, and heat conductivity, are adjusted, if necessary.

When the recording liquid of this invention is used with usual writing tools, its physical properties are adjusted in consideration of viscosity, affinities for various recording members, and other factors.

The present invention will be illustrated in more detail by the following Examples:

EXAMPLE 1

Recording liquid (I)

| | |
|---|---|
| Compound No. 21 cited above (commercial dye: Water Black P-200 mfd. by Orient Chem. Co) | 3 parts by weight |
| Compound No. 157 (commercial dye: Water Black P-187 mfd. by Orient Chem. Co.) | 2 parts by weight |
| Diethylene glycol | 35 parts by weight |
| Deionized Water | 60 parts by weight |

The above components were throughly mixed into solution in a vessel, the pressure-filtered through a Tef- Ion filter of pore size 1. The filtrate was degassed by vacuum-pumping to make up to a recording liquid (I).

Recording liquids (I) and (III) of the following compositions were prepared as comparative samples in the same manner as the above.

Recording liquid (II)

| Compound No. 21 | 5 parts by weight |
|---|---|
| Diethylene glycol | 35 parts by weight |
| Deionized Water | 60 parts by weight |

Recording liquid (III)

| Compound No. 157 | 5 parts by weight |
|---|---|
| Diethylene glycol | 35 parts by weight |
| Deionized Water | 60 parts by weight |

The following items $T_1$–$T_4$ were examined on these recording solutions (I), (II) and (III) using a recorder provided with an on-demand type of recording head (discharging orifice diameter 50μ, piezo oscillator driving voltage 80 V, frequency 3 KHz) for discharging a recording liquid with a piezo oscillator.

The results were as follows:

($T_1$) Strage stability of recording liquid; samples were stored at $-30°$ C. and $60°$ C. for 6 months.

|  | Liberation of insoluble matter | Change in viscosity |
|---|---|---|
| Recording liquid (I) | None | None |
| Recording liquid (II) | None | Increased |
| Recording liquid (III) | A small amount | Slightly increased |

Recording liquid (I) gave good recording results after 10-month or longer storage under the above conditions.

($T_2$) Discharging stability; samples were discharged continuously for 24 hours at room temperature, $0°$ C. and $40°$ C.

Recording liquid (I): Discharge was stable at all these temperatures.

Recording liquid (II): Discharge was stopped occasionally in the $0°$ C. operation.

Recording solution (III): The same as (II).

($T_3$) Discharging responsiveness; performance of intermittent discharge at two-second intervals and of discharge after four-month standing.

|  | Intermittent discharge | Discharge after 4-month standing |
|---|---|---|
| Recording liquid (I) | Discharge was stable | No clogging of orifice occurred |
| Recording liquid (II) | Discharge was stable | Discharge was stopped often |
| Recording liquid (III) | Discharge was stable | Discharge was infeasible on account of clogging |

($T_4$) Quality of recorded image:
Light resistance: 100-hour exposure by using a xenon fade meter
Water resistance: 24-hour immersion in water
Alcohol resistance: 24-hour immersion in alcohol

|  | Light resistance | Water resistance | Alcohol resistance |
|---|---|---|---|
| Recording liquid (I) | Almost no fading | No change | No change |
| Recording liquid (II) | Slightly faded | No change | No change |
| Recording liquid (III) | Considerably faded | Almost no change | Slight color fading occurred |

EXAMPLE 2

Recording liquid (IV)

| Compound No. 23 cited above | 2 parts by weight |
|---|---|
| Compound No. 204 cited above (commercial dye: Direct deep Black EX mfd. by Hamamoto Dyestuff Co.) | 2 parts by weight |
| Triethylene glycol monomethyl ether | 20 parts by weight |
| N—methyl-2-pyrrolidone | 10 parts by weight |
| Deionized water | 66 parts by weight |

The above composition of components were thoroughly mixed into solution in a vessel, and pressure-filtered through a Teflon filter of pore size 0.45μ. The filtrate was degassed by vacuum-pumping to make up to a recording liquid (IV).

Recording liquids (V) and (VI) of the following compositions were prepared as comparative samples in the manner as the above.

Recording liquid (V)

| Compound No. 23 | 4 parts by weight |
|---|---|
| Triethylene glycol monomethyl ether | 20 parts by weight |
| N—methyl-2-pyrrolidone | 10 parts by weight |
| Deionized water | 66 parts by weight |

Recording liquid (VI)

| Compound No. 204 | 4 parts by weight |
|---|---|
| Triethylene glycol monomethyl ether | 20 parts by weight |
| N—methyl-2-pyrrolidone | 10 parts by weight |
| Deionized water | 66 parts by weight |

These recording liquids were tested for frequency responsiveness using the on-demand type of ink-jet recorder mentioned above. The frequency responsiveness was evaluated by measuring stable discharge voltage margins (the value $V_s - V_{th}$, wherein $V_{th}$ is a driving voltage where the discharge of droplet begins and $V_s$ is a driving voltage where the discharge becomes irregular when the driving voltage is raised gradually) at different frequencies of the piezo oscillator of 1, 2, 3, 4 and 5 KHz. The results were as follows:

|  | $V_s - V_{th}$ at the driving frequency | | | | |
|---|---|---|---|---|---|
|  | 1 KHz | 2 KHz | 3 KHz | 4 KHz | 5 KHz |
| Recording liquid (IV) | 37 | 26 | 18 | 12 | 5 |
| Recording liquid (V) | 15 | 11 | 4 | 1 | 0 |
| Recording liquid (VI) | 18 | 13 | 6 | 2 | 0 |

EXAMPLE 3

Recording liquids of the following compositions were prepared and tested for $T_1$ to $T_4$, in the same manner as in Example 3.

All the samples exhibited stable discharge and gave high quality recorded images.

The same further tests as in Example 1 were also conducted by using a recorder provided with an on-demand type of multi-head (discharging orifice diameter 35μ, resistance value of heating resistor 150 Ω, driving voltage 30 V, frequency 2 KHz) for generation of droplets by giving thermal energy to a recording liquid in the head. Good results were obtained in all these cases.

| Example No. | Component | Weight % |
|---|---|---|
| 3-1 | Compound No. 4 | 6 |
| | Compound No. 205 | 2 |
| | Ethylene glycol | 10 |
| | Diethylene glycol | 10 |
| | Water | 72 |
| 3-2 | Compound No. 10 | 10 |
| | Compound No. 206 | 10 |
| | Diethylene glycol | 20 |
| | N—methyl-2-pyrrolidone | 10 |
| | Water | 50 |
| 3-3 | Compound No. 57 | 5 |
| | Compound No. 21 | 5 |
| | Compound No. 172 | 2 |
| | Glycerol | 10 |
| | Polyoxyethylene lauryl ether | 0.1 |
| | Water | 78 |
| 3-4 | Compound No. 5 | 7 |
| | Compound No. 199 | 5 |
| | Propylene glycol | 30 |
| | Dioxane | 0.1 |
| | Water | 58 |
| 3-5 | Compound No. 157 (Water Black 187-L) | 10 |
| | Compound No. 59 | 1 |
| | Propylene glycol | 20 |
| | Urea | 2 |
| | Water | 67 |
| 3-6 | Compound No. 58 | 2 |
| | Compound No. 147 | 1 |
| | Triethylene glycol monomethyl ether | 20 |
| | Lithium chloride | 1 |
| | Urea | 1 |
| | Water | 75 |
| 3-7 | Compound No. 141 | 5 |
| | Compound No. 21 | 5 |
| | Diethylene glycol | 20 |
| | Triethylene glycol monomethyl ether | 10 |
| | Water | 60 |
| 3-8 | Compound No. 59 | 3 |
| | Compound No. 141 | 4 |
| | Polyethylene glycol | 10 |
| | Thio-diglycol | 10 |
| | Water | 73 |
| 3-9 | Compound No. 21 [Direct Fast Black G (C.I. Direct Black 19)] | 2 |
| | Compound No. 198 | 3 |
| | Ethylene glycol | 25 |
| | 1,3-Dimethyl-2-imidazolydinone | 5 |
| | Water | 65 |
| 3-10 | Compound No. 157 (Water Black 187L) | 5 |
| | Compound No. 57 | 6 |
| | Compound No. 21 | 5 |
| | Diethylene Glycol | 20 |
| | Thio-diglycol | 5 |
| | Water | 59 |
| 3-11 | Compound No. 147 | 1 |
| | Compound No. 21 | 2 |
| | Diethylene glycol | 20 |
| | N—methyl-2-pyrrolidone | 10 |
| | Water | 67 |
| 3-12 | Compound No. 58 | 1 |
| | Compound No. 197 | 1 |
| | Diethylene glycol | 30 |
| | Diacetone alcohol | 15 |
| | Triethanolamine | 5 |
| | Water | 48 |
| 3-13 | Compound No. 21 | 2 |
| | Compound No. 204 | 3 |
| | Diethylene glycol | 30 |
| | Water | 65 |
| 3-14 | Compound No. 157 | 2 |
| | Compound No. 59 | 1 |
| | Triethylene glycol | 30 |
| | Water | 67 |
| 3-15 | Compound No. 14 | 1 |
| | Compound No. 199 | 5 |
| | Propylene glycol | 25 |
| | Water | 69 |
| 3-16 | Compound No. 204 [Direct Fast Black Conc. (C.I. Direct Black 38)] | 2 |
| | Compound No. 21 | 2 |
| | Triethylene glycol monoethyl ether | 40 |
| | Water | 56 |
| 3-17 | Compound No. 21 | 3 |
| | Compound No. 151 | 4 |
| | Triethylene glycol monomethyl ether | 20 |
| | Diethylene glycol | 20 |
| | Water | 53 |
| 3-18 | Compound No. 21 | 3 |
| | Compound No. 157 | 3 |
| | Triethylene glycol monomethyl ether | 20 |
| | N—methyl-2-pyrrolidone | 10 |
| | Sodium dodecyl sulfate | 0.1 |
| | Water | 64 |
| 3-19 | Compound No. 154 | 2 |
| | Compound No. 59 | 2 |
| | 1,2,3-Hexanetriol | 5 |
| | Ethylene glycol | 35 |
| | Water | 56 |
| 3-20 | Compound No. 10 | 3 |
| | Compound No. 160 | 3 |
| | Diethylene glycol | 35 |
| | Triethylene glycol | 5 |
| | Water | 54 |

EXAMPLE 4

Recording liquids (I), (II) and (III) prepared in Example 1 were each filled into a sign pen (soft tip pen) and an image was written therewith on medium quality paper (trade mark: Hakubotan; mfd, by Honshu Paper Co., Ltd.). Tests were conducted for water resistance on the written images and for the writing function of the recording liquids left for 48 hours in the pens of which caps were detached. The results were as follows:

| | Water resistance of image (immersed in water after 5 min. from writing) | Writing function (after 48-hour standing in a pen with the cap detached) |
|---|---|---|
| Recording liquid (I) | Good, no blotting | Smooth |
| Recording liquid (II) | Good, no blotting | Blurred |
| Recording liquid (III) | Slight blotting | Slightly blurred |

Recording liquid (I), an embodiment of this invention was superior to the other recording liquids in water resistance of written images and in writing function after standing.

As illustrated above, the recording liquid of this invention is by far better in various characteristics than conventional recording liquids.

What we claim is:

1. A recording liquid comprising a recording agent for giving recorded images and a liquid medium for dissolving or dispersing the recording agent, characterized in that the recording agent comprises at least one of the compounds represented by the following formula (A) and at least one of the compounds represented by the following formula (B):

Formula (A)

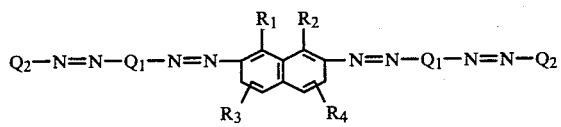

wherein $Q_1$ and $Q_2$ each represent benzene ring residue or naphthalene ring residue, unsubstituted or substituted by amino, hydroxyl, or sulfo; $R_1$ and $R_2$ each represent hydrogen, hydroxyl, or amino; and $R_3$ and $R_4$ each represent hydrogen or sulfo in the form of salt with an alkali selected from sodium, lithium, potassium, ammonium, and amines, wherein the number of sulfo groups in the molecule is 2 to 8;

Formula (B)

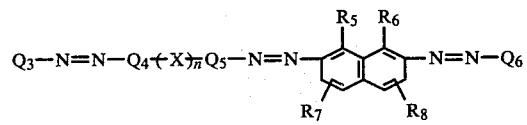

wherein $Q_3$ and $Q_6$ each represent phenyl or naphthyl, substituted or unsubstituted; $Q_4$ and $Q_5$ each represent 1,4-phenylene or 1,4-naphthylene, substituted or unsubstituted; $R_5$ and $R_6$ each represent hydrogen, hydroxyl, or amino; $R_7$ and $R_8$ each represent hydrogen or sulfo in the form of salt with an alkali selected from sodium, lithium, potassium, ammonium, and amines; X represents —NH—, —N=N—, or —CH=CH—; and n is 0 or 1.

2. A recording liquid of claim 1, wherein the ratio of a compound represented by formula (A) to a compound represented by formula (B) is within the range of 9:1 to 1:9 by weight.

3. A recording liquid of claim 1, wherein the total content of compounds represented by formulae (A) and (B), respectively, is within the range of 0.5 to 20% by weight of the whole weight of the recording liquid.

4. A recording liquid of claim 1, wherein the liquid medium contains water in an amount of 5 to 95% by weight of the whole weight of the recording liquid.

* * * * *

UNITED STATES PATENT AND TRADEMARK OFFICE
CERTIFICATE OF CORRECTION

PATENT NO. : 4,426,226
DATED : January 17, 1984
INVENTOR(S) : Tokuya Ohta et al.

It is certified that error appears in the above-identified patent and that said Letters Patent is hereby corrected as shown below:

Column 49, line 3, "(I)" should read -- (II) --.

Column 25, Formula 109, should appear as shown below:

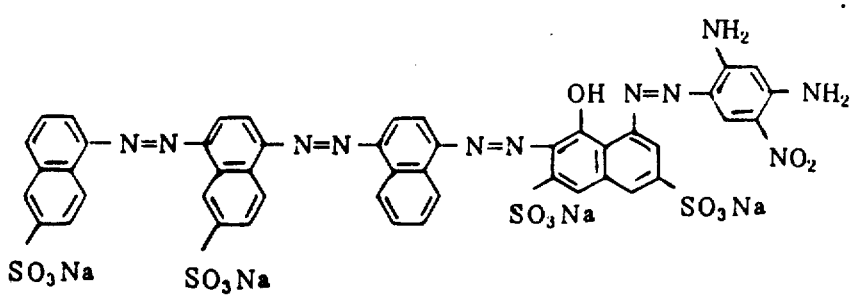

Column 25, Formula 110, should appear as shown below:

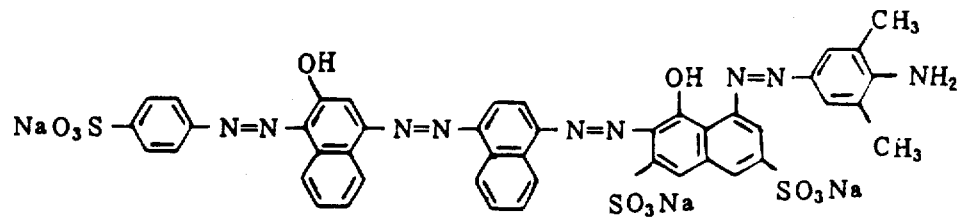

UNITED STATES PATENT AND TRADEMARK OFFICE
CERTIFICATE OF CORRECTION

PATENT NO. : 4,426,226
DATED : January 17, 1984
INVENTOR(S) : Tokuya Ohta et al.

It is certified that error appears in the above-identified patent and that said Letters Patent is hereby corrected as shown below:

Column 29, Formula 119, should appear as shown below:

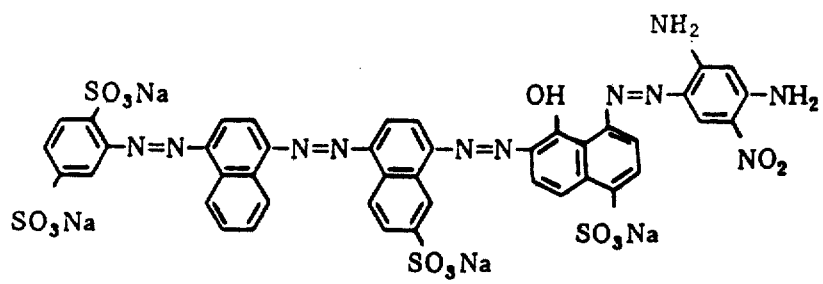

UNITED STATES PATENT AND TRADEMARK OFFICE
CERTIFICATE OF CORRECTION

PATENT NO. : 4,426,226
DATED : January 17, 1984
INVENTOR(S) : Tokuya Ohta et al.

It is certified that error appears in the above-identified patent and that said Letters Patent is hereby corrected as shown below:

Column 31, Formula 128, should appear as shown below:

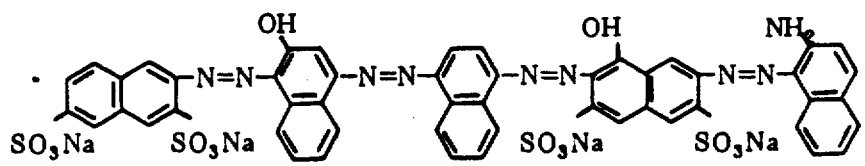

Signed and Sealed this

Twelfth Day of June 1984

[SEAL]

Attest:

GERALD J. MOSSINGHOFF

Attesting Officer     Commissioner of Patents and Trademarks